US011115335B2

(12) United States Patent
Yamagishi

(10) Patent No.: US 11,115,335 B2
(45) Date of Patent: Sep. 7, 2021

(54) INFORMATION PROCESSING DEVICE AND INFORMATION PROCESSING METHOD

(71) Applicant: Saturn Licensing LLC, New York, NY (US)

(72) Inventor: Yasuaki Yamagishi, Kanagawa (JP)

(73) Assignee: Saturn Licensing LLC, New York, NY (US)

( * ) Notice: Subject to any disclaimer, the term of this patent is extended or adjusted under 35 U.S.C. 154(b) by 0 days.

(21) Appl. No.: 16/330,941

(22) PCT Filed: Oct. 13, 2017

(86) PCT No.: PCT/JP2017/037118
§ 371 (c)(1),
(2) Date: Mar. 6, 2019

(87) PCT Pub. No.: WO2018/079295
PCT Pub. Date: May 3, 2018

(65) Prior Publication Data
US 2019/0238464 A1 Aug. 1, 2019

(30) Foreign Application Priority Data
Oct. 27, 2016 (JP) .............................. JP2016-210144

(51) Int. Cl.
G06F 15/16 (2006.01)
H04L 12/803 (2013.01)
(Continued)

(52) U.S. Cl.
CPC ........... H04L 47/122 (2013.01); H04H 20/24 (2013.01); H04H 20/26 (2013.01); H04L 47/19 (2013.01);
(Continued)

(58) Field of Classification Search
CPC .................................................... H04L 47/122
See application file for complete search history.

(56) References Cited

U.S. PATENT DOCUMENTS

2008/0022190 A1 1/2008 Ver Steeg
2013/0028118 A1 1/2013 Cherian et al.
(Continued)

FOREIGN PATENT DOCUMENTS

CN 101420375 A 4/2009
CN 103004229 A 3/2013
(Continued)

OTHER PUBLICATIONS

International Search Report dated Jan. 16, 2018 in PCT/JP2017/037118 filed Oct. 13, 2017.
(Continued)

Primary Examiner — Kevin T Bates
Assistant Examiner — Clarence D McCray
(74) Attorney, Agent, or Firm — Oblon, McClelland, Maier & Neustadt, L.L.P.

(57) ABSTRACT

The present technology relates to an information processing device and an information processing method, in which streaming traffic can be subjected to a load dispersion by using a broadcast network.

An information processing device processes a request of contents, to be transmitted from a plurality of receiving devices, and dynamically switches return through communication and return through broadcast, as a return path of a response with respect to the request, on the basis of first identification information for identifying a broadcast area capable of being received by the receiving device, and second identification information for identifying the contents, the first identification information and the second identification information being included in the request, and
(Continued)

thus, streaming traffic can be subjected to a load dispersion. The present technology, for example, can be applied to a dedicated server (a switching server) provided on a server backend side.

20 Claims, 32 Drawing Sheets

(51) Int. Cl.
| | |
|---|---|
| *H04L 29/08* | (2006.01) |
| *H04N 21/238* | (2011.01) |
| *H04N 21/24* | (2011.01) |
| *H04W 4/06* | (2009.01) |
| *H04N 21/2381* | (2011.01) |
| *H04N 21/647* | (2011.01) |
| *H04H 20/26* | (2008.01) |
| *H04N 21/239* | (2011.01) |
| *H04N 21/258* | (2011.01) |
| *H04N 21/61* | (2011.01) |
| *H04N 21/658* | (2011.01) |
| *H04H 20/24* | (2008.01) |
| *H04L 12/801* | (2013.01) |
| *H04N 21/2385* | (2011.01) |
| *H04N 21/2225* | (2011.01) |

(52) U.S. Cl.
CPC .......... *H04L 67/02* (2013.01); *H04L 67/2814* (2013.01); *H04N 21/2381* (2013.01); *H04N 21/2393* (2013.01); *H04N 21/23805* (2013.01); *H04N 21/2402* (2013.01); *H04N 21/2408* (2013.01); *H04N 21/25841* (2013.01); *H04N 21/6106* (2013.01); *H04N 21/64707* (2013.01); *H04N 21/64738* (2013.01); *H04N 21/6581* (2013.01); *H04W 4/06* (2013.01); *H04N 21/2225* (2013.01); *H04N 21/2385* (2013.01)

(56) References Cited

U.S. PATENT DOCUMENTS

| | | | |
|---|---|---|---|
| 2013/0124683 A1* | 5/2013 | Watanabe | H04N 21/4622 709/217 |
| 2014/0269437 A1 | 9/2014 | Kotecha et al. | |
| 2014/0301202 A1 | 10/2014 | Bouazizi | |
| 2014/0372624 A1* | 12/2014 | Wang | H04L 69/18 709/231 |
| 2015/0288733 A1* | 10/2015 | Mao | H04L 65/602 709/219 |
| 2016/0182586 A1* | 6/2016 | Li | H04W 4/06 709/219 |

FOREIGN PATENT DOCUMENTS

| | | |
|---|---|---|
| CN | 104471895 A | 3/2015 |
| CN | 104838661 A | 8/2015 |
| CN | 105308932 A | 2/2016 |
| CN | 105340289 A | 2/2016 |
| JP | 2016-516379 A | 6/2016 |

OTHER PUBLICATIONS

Extended European Search Report dated Jul. 3, 2019 in Patent Application No. 17864973.7, citing documents AA-AD therein, 9 pages.

* cited by examiner

FIG. 7

```
<MPD ...>
 <Period ...>
  <AssetIdentifier schemeIdUri="urn:org:dashif:asset-id:2013"
   value="md:cid:EIDR:10.5240%2f0EFB-02CD-126E-8092-1E49-W"/>  ----> AssetId-1
  <AdaptationSet ...>
   <Representation ...>
    <SegmentList>
     <SegmentURL>http://a.com/a-1-1.mp4</SegmentURL>   ----> SegURL-1-1
     <SegmentURL>http://a.com/a-1-2.mp4</SegmentURL>   ----> SegURL-1-2
     <SegmentURL>http://a.com/a-1-3.mp4</SegmentURL>   ----> SegURL-1-3
     ....
    </SegmentList>
   </Representation>
  </AdaptationSet>
 </Period>
</MPD>
```

FIG. 18

SYNTAX OF ATSC3.0-Request

```
ATSC3.0-Request = "atsc3.0-request" ";" *serviceAttribute
serviceAttribute =
   "service-id" "=" serviceId
   | contentId
   | "mpd-uri" "=" absoluteURI
   | "broadcastTime" "=" HTTP-date
   | broadcastStreamIdList
contentId =
   "eidr" "=" EIDR
   | "ad-id" "=" Ad-ID
broadcastStreamIdList =
   "bsid" "=(" *bsid ")"
```

FIG. 21

SEGMENT REQUEST TO WHICH EXPANSION HEADER IS INSERTED

```
GET /a.mp4 HTTP/1.1
HOST a.com
...
atsc3.0-request:service-id=urn:atsc:serviceId:NBCU-NFL-1, eidr=md:cid:EIDR:10.5240%2F0EFB-02CD-126E-8092-1E49-W,
mpd-uri=http://a.com/a.mpd, broadcastTime=Fri, 04 Jul 2016 23:54:58 GMT, bsid=(bsid-1)
...
```

FIG. 22

| serviceCategory | Meaning |
|---|---|
| 0 | Reserved |
| 1 | Linear A/V service |
| 2 | Linear audio only service |
| 3 | App-based service |
| 4 | ESG service (program guide) |
| 5 | EAS service (emergency alert) |
| 6 | Broadcast off-loading service |
| Other values | Reserved for future use |

FIG. 23

```
<SLT ...>
 ...
 <Service ... serviceCategory="6" ...>
  ...
 </Service>
 ...
</SLT>
```

*FIG. 24*

5.2.2.1.1 ServiceType

The ServiceType element values are extended to include two proprietary ATSC 3.0 service types:
- A ServiceType element shall be included with value 228 to indicate that the Service fragment contains information regarding an ATSC 3.0 Linear service.
- A ServiceType element shall be included with value 229 to indicate that the Service fragment contains information regarding an ATSC 3.0 App-based service with app-based enhancement.

A ServiceType element shall be included with value 230 to indicate that the Service fragment contains information regarding an ATSC 3.0 Broadcast off-loading service.

*FIG. 25*

```
<Service id='//a.com/Service-1'...>
 ...
 <ServiceType>230</ServiceType>
 ...
</Service>
```

FIG. 26

```
<Service id='//a.com/Service-1'...>
:
<ServiceType>230</ServiceType>
:
</Service>

<Content id='//a.com/Content-1-1'>
<ServiceReference idRef='//a.com/Service-1'/>
<Name> Broadcast-Off-loading Service </Name>
:
</Content>

<Schedule id='//a.com/Schedule-1-1'>
<ServiceReference idRef='//a.com/Service-1'/>
<ContentReference idRef='//a.com/Content-1-1'/>
<PresentationWindow startTime="2016-09-12T13:00:00+00:00"; endTime="2016-09-12T15:00:00+00:00";/>
</ContentReference>
</Schedule>
``` t1     t2

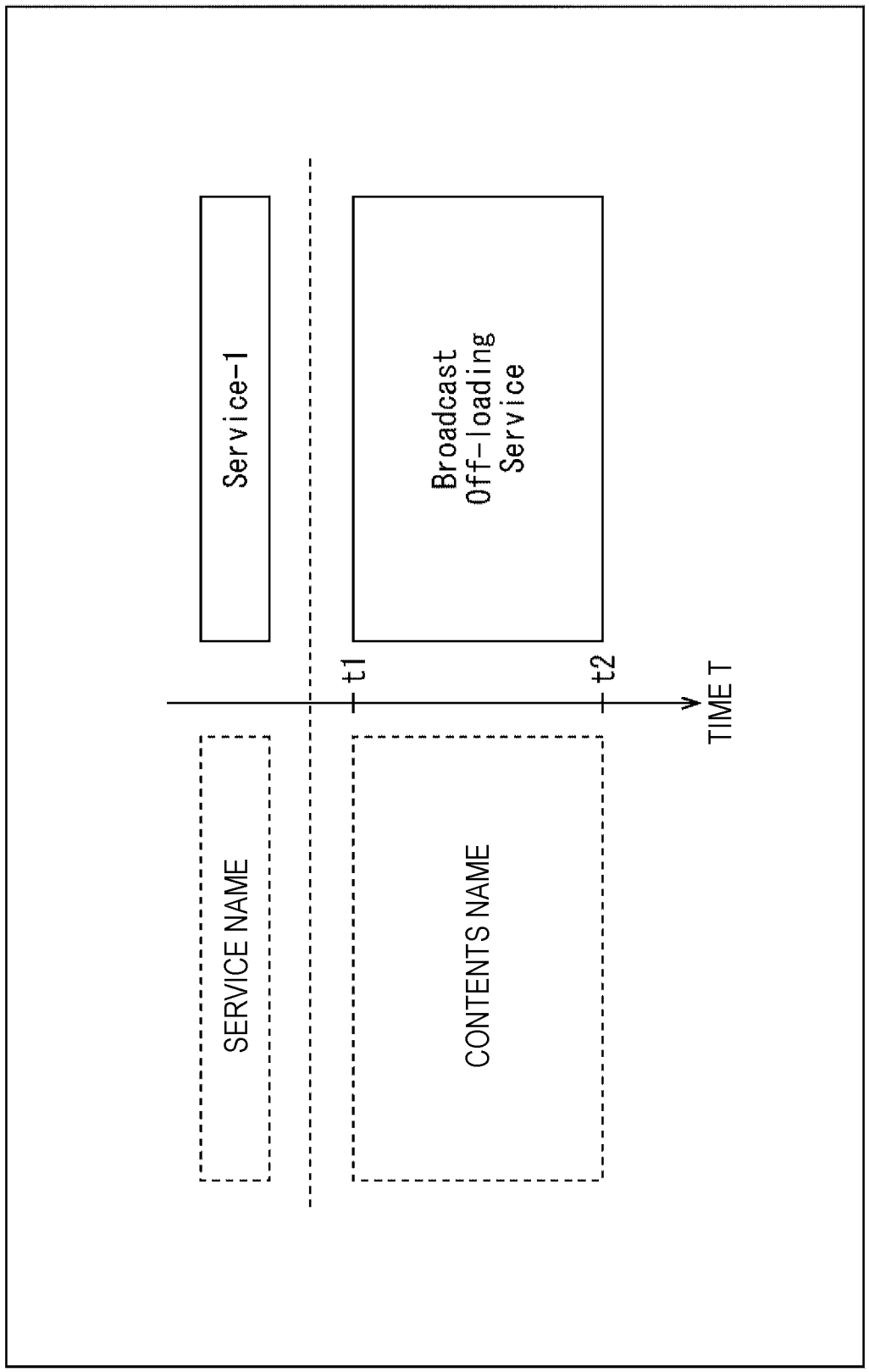

INFORMATION PROCESSING DEVICE AND INFORMATION PROCESSING METHOD

TECHNICAL FIELD

The present technology relates to an information processing device and an information processing method, and in particular, relates to an information processing device and an information processing method, in which streaming traffic can be subjected to a load dispersion by using a broadcast network.

BACKGROUND ART

The standardization of a system to be applied to video on demand (VOD) streaming or live streaming according to hypertext transfer protocol (HTTP) streaming, has been performed as a flow of standardization in Internet streaming, such as an Internet protocol television (IPTV).

In particular, a dynamic adaptive streaming over HTTP (MPEG-DASH) of which the standardization is performed in ISO/IEC/MPEG, has attracted attention (for example, refer to Non-Patent Document 1).

In the MPEG-DASH, stream data is acquired and reproduced according to a metafile referred to as media presentation description (MPD), and an address (a uniform resource locator: URL) of media data such as the chunked sound, video, or caption, described in the metafile.

CITATION LIST

Non-Patent Document

Non-Patent Document 1: ISO/IEC 23009-1: 2012 Information technology Dynamic adaptive streaming over HTTP (DASH)

SUMMARY OF THE INVENTION

Problems to be Solved by the Invention

However, in the traffic of the streaming such as MPEG-DASH, there is a requisite in which in a case where a large load is applied to the Internet, and the traffic is likely to be congested, the traffic is subjected to a load dispersion by using a broadcast network.

However, in such an off-loading destination of the Internet traffic, a technical method for using the broadcast network has not been established, and a technology for performing the load dispersion with respect to the streaming traffic by using the broadcast network, has been required.

The present technology has been made in consideration of such circumstances described above, and enables a streaming traffic to be subjected to a load dispersion by using a broadcast network.

Solutions to Problems

An information processing device of a first aspect of the present technology, is an information processing device, including: a processor configured to process a request of contents, to be transmitted from a plurality of receiving devices, and to return a response with respect to the request, in which the request includes first identification information for identifying a broadcast area capable of being received by the receiving device, and second identification information for identifying the contents, and the processor dynamically switches return through communication and return through broadcast, as a return path of the response, on the basis of the first identification information and the second identification information.

The information processing device of the first aspect of the present technology, may be an independent device, or may be an internal block including one device. In addition, an information processing method of the first aspect of the present technology, is an information processing method corresponding to the information processing device of the first aspect of the present technology described above.

In the information processing device and the information processing method of the first aspect of the present technology, the request of the contents, to be transmitted from the plurality of receiving devices, is processed, and the response with respect to the request, is returned. In addition, the request includes the first identification information for identifying the broadcast area capable of being received by the receiving device, and the second identification information for identifying the contents, and the return through communication and the return through broadcast are dynamically switched, as the return path of the response, on the basis of the first identification information and the second identification information.

An information processing device of a second aspect of the present technology, is an information processing device, including: a processor configured to process a request of contents, and to insert first identification information for identifying a broadcast area capable of being received by the processor, and second identification information for identifying the contents, in which the processor processes a response to be returned through communication or a response to be returned through broadcast, as a response with respect to the request to be transmitted from a transmitting device.

The information processing device of the second aspect of the present technology, may be an independent device, or may be an internal block including one device. In addition, an information processing method of the second aspect of the present technology, is an information processing method corresponding to the information processing device of the second aspect of the present technology described above.

In the information processing device and the information processing method of the second aspect of the present technology, the request of the contents is processed, the first identification information for identifying the broadcast area capable of being received by the processor, and the second identification information for identifying the contents are inserted, and the response to be returned through communication or the response to be returned through broadcast, is processed as the response with respect to the request to be transmitted from the transmitting device.

Effects of the Invention

According to the first aspect and the second aspect of the present technology, streaming traffic can be subjected to a load dispersion by using a broadcast network.

Furthermore, the effects described here are not necessarily limited, and may be any of the effects described in the present disclosure.

BRIEF DESCRIPTION OF DRAWINGS

FIG. 7 is a diagram illustrating a description example of the MPD metadata.

FIG. 18 is a diagram illustrating an example of an expansion header of the present technology.

FIG. 21 is a diagram illustrating an example of the HTTP request to which the expansion header is inserted.

FIG. 22 is a diagram illustrating an example of the value of serviceCategory attribute of SLT metadata.

FIG. 23 is a diagram illustrating a description example of the SLT metadata.

FIG. 24 is a diagram illustrating an example of the value of a ServiceType element of ESG.

FIG. 25 is a diagram illustrating a description example of ESG information.

FIG. 26 is a diagram illustrating a relationship of an XML fragment in a case where broadcast off-loading service is capable of being used.

FIG. 27 is a diagram illustrating a display example of a screen of ESG service.

MODE FOR CARRYING OUT THE INVENTION

Hereinafter, embodiments of the present technology will be described with reference to the drawings. Furthermore, the description will be made according to the following items.

1. Configuration of System
2. Specific Operation Example
3. Example of Request/Response Traffic
4. Inserting Method of Identification Information
5. Well-Known Method of Broadcast Off-Loading Service
6. Contents Transmitting and Receiving Processing
7. Modification Example
8. Configuration of Computer 1. Configuration of System (Outline of Present Technology)

Figure 1:
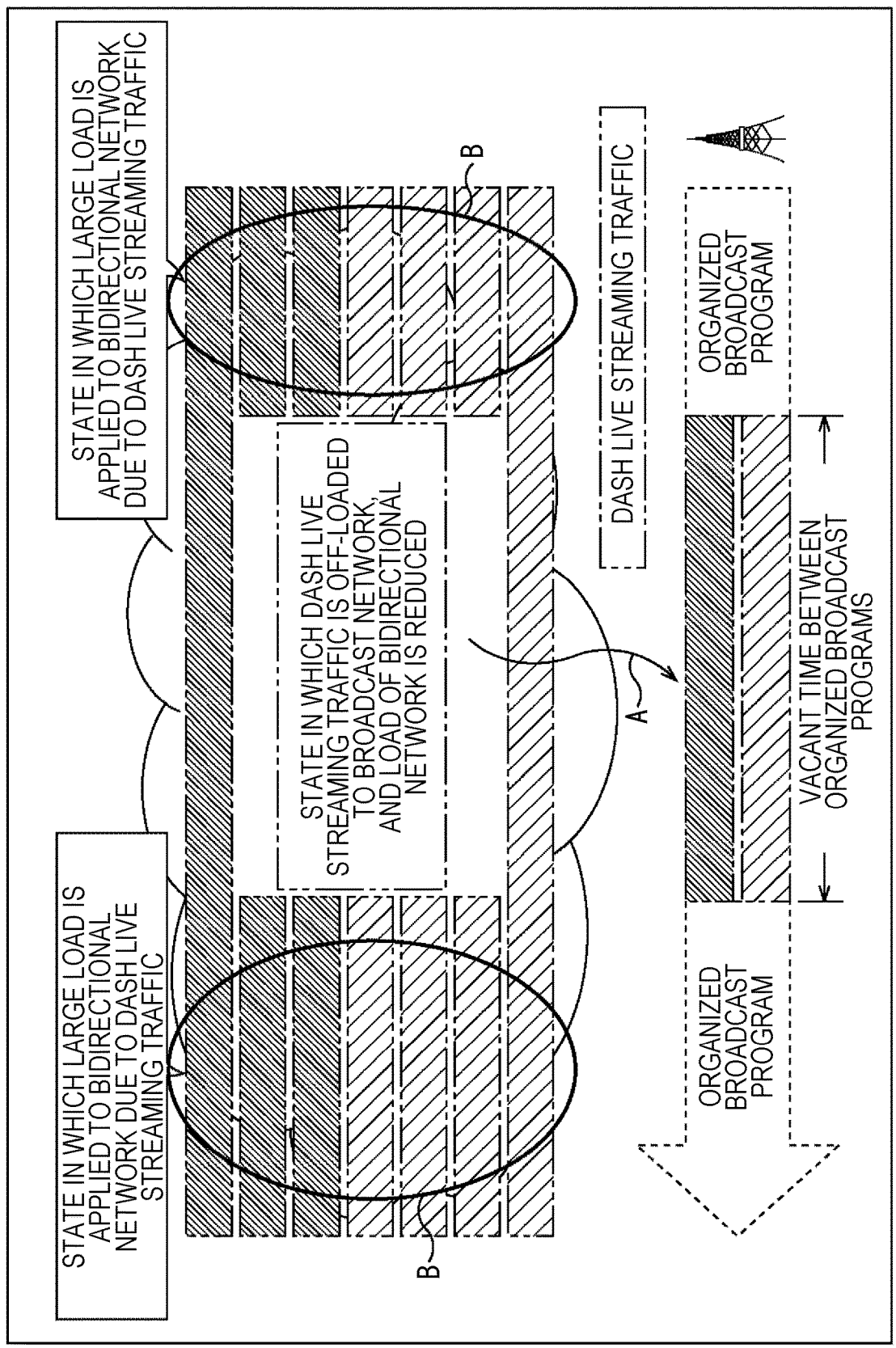
FIG. 1 is a diagram illustrating the outline of the present technology.

FIG. 1 is a diagram illustrating the outline of the present technology.

There is a requisite for traffic off-loading in which a broadcast network is used for an off-loading destination of Internet traffic such as live streaming. Here, in the traffic off-loading, in a case where the Internet traffic is likely to be congested, the traffic is subjected to a load dispersion by using the broadcast network as a shortcut path.

For example, in FIG. 1, a state is schematically illustrated in which a part of DASH live streaming traffic according to MPEG-DASH, is off-loaded to the broadcast network.

That is, in FIG. 1, in a bidirectional network such as the Internet, a large load is applied due to the DASH live streaming traffic. For this reason, as illustrated by an arrow A in the drawing, the DASH live streaming traffic in a middle region, is off-loaded to the broadcast network (an unidirectional network).

However, when the traffic is off-loaded to the broadcast network, the broadcast network of the off-loading destination is at a vacant time between organized broadcast programs, during which an organized broadcast program is not broadcast. Alternatively, here, in a case where a bandwidth of a frequency necessary for broadcast streaming of the organized broadcast program, is small, a frequency band for off-load (a vacant band) may be prepared.

Thus, in the middle region of the drawing, in which a part of the DASH live streaming traffic is off-loaded to the broadcast network (a load dispersion, delegation), and thus, the traffic is off-loaded, the load of the bidirectional network such as the Internet, is reduced.

On the other hand, in a region of a frame B on the right and left of the drawing, the DASH live streaming traffic is not off-loaded, and thus, a large load due to the DASH live streaming traffic, is applied to the bidirectional network such as the Internet.

As described above, the off-loading destination of the DASH live streaming traffic is set to the broadcast network, and thus, the traffic can be subjected to the load dispersion, but in the present state, such a technical method has not been established.

For example, a function of specifying an area on which the traffic of streaming service is particularly concentrated, and of preferentially off-loading a part of the traffic with respect to the broadcast network in which the area is a broadcast target, is necessary.

In addition, for example, a function of providing a determination standard of a streaming acquisition destination as to whether or not a device on a receiving side is informed of a situation in which the traffic of the streaming service is off-loaded to the broadcast network, and the device on the receiving side waits for streaming to be delivered from the broadcast network or the bidirectional network, is necessary.

Such a function may be essential from the viewpoint of effectively using resource in streaming delivery, but in the present state, a technical method for providing such a function, has not been established.

On the other hand, such a function is integrated with a terminal on the receiving side (a local proxy server) on which a tuner corresponding to a specific broadcast network is mounted, and thus, an operation framework of broadcast network off-loading that can be commonly applied, can be provided to a terminal on the receiving side (a general client) on which the tuner is not mounted.

In the present technology, a technical method for satisfying the following requisites, is proposed. Hereinafter, the contents will be described.

(Configuration Example of Transmitting and Receiving System)

Figure 2:
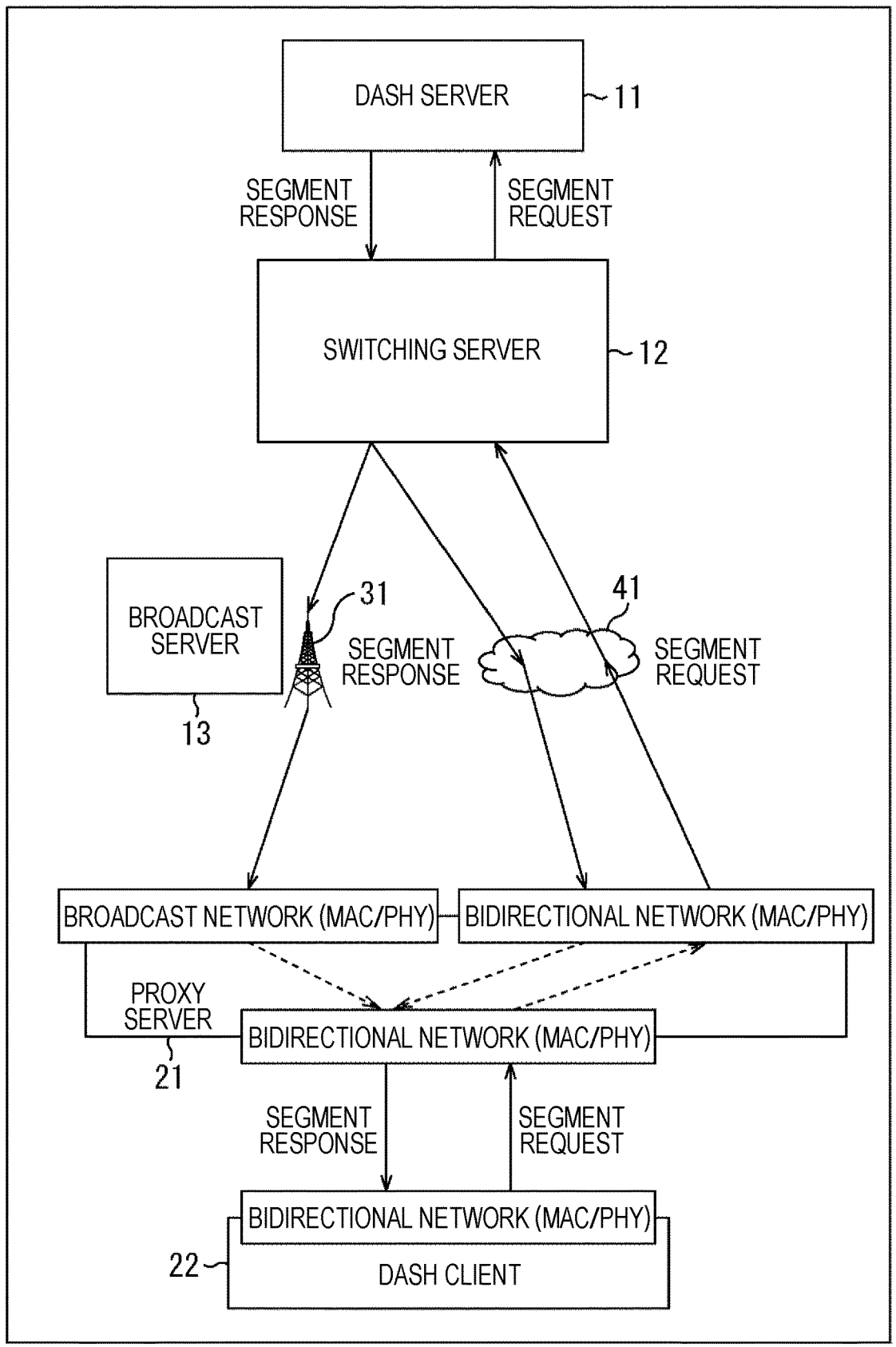
FIG. 2 is a block diagram illustrating a configuration of one embodiment of a transmitting and receiving system to which the present technology is applied.

FIG. 2 is a block diagram illustrating a configuration of one embodiment of a transmitting and receiving system to which the present technology is applied.

In FIG. 2, the transmitting and receiving system includes a DASH server 11, a switching server 12, and a broadcast server 13, on a transmitting side, and a proxy server 21 and a DASH client 22, on a receiving side.

That is, the proxy server 21 and the switching server 12 are provided between the DASH client 22 and the DASH server 11 that are in a relationship of a client and a server.

The proxy server 21, for example, is configured as a dedicated server, a television set, a set top box (STB), a network storage, a game machine, and the like.

The proxy server 21 includes a tuner that is capable of receiving a broadcast wave (a broadcast signal), and a communication I/F that is capable of being connected to the Internet 41. That is, the proxy server 21 has an interface of a broadcast network (MAC/PHY) according to the tuner, and has the interface of the bidirectional network (MAC/PHY) such as the Internet 41 according to the communication I/F.

In addition, the proxy server 21 and the DASH client 22 are connected to each other through a bidirectional network such as a domestic local area network (LAN) constructed in the house of an end user, and thus, communication can be performed. That is, the proxy server 21 has the interface of the bidirectional network (MAC/PHY) such as the domestic LAN according to the communication I/F.

The DASH client 22 is configured as a fixed receiver such as a television set, a set top box, a personal computer, and a game machine, or a mobile receiver such as a smart phone, a mobile telephone, or a tablet type computer. Further, the DASH client 22 may be a wearable computer such as a head mounted display (HMD).

The DASH client 22 has the interface of the bidirectional network (MAC/PHY) such as the domestic LAN according to the communication I/F. The DASH client 22 is capable of reproducing (or recording) a contents stream (a DASH segment).

The switching server 12 is provided on the DASH server 11 side, and has a switching function (Bi/Uni-directional Switching) of the bidirectional network (the Internet 41) and the unidirectional network (the broadcast network). The switching server 12, for example, is configured as a dedicated server.

The switching server 12 itself performs data delivery through communication, through the bidirectional network such as the Internet 41. On the other hand, the switching server 12 asks the broadcast server 13 to perform the data delivery through broadcast, through the unidirectional network such as the broadcast network.

The DASH server 11 has a delivery function of the contents stream (the DASH segment). The DASH server 11, for example, is configured as a dedicated server. Examples of a stream to be delivered from the DASH server 11 include a live stream of a live program, a video on demand (VOD) stream of a recording program or a video, and the like.

The DASH server 11 and the switching server 12 are connected to each other through the bidirectional network such as the LAN, and thus, communication can be performed.

The broadcast server 13 has a function of transmitting the contents stream (the DASH segment), control information thereof, program information, and the like, as the broadcast wave (the broadcast signal), through the broadcast network (the unidirectional network).

Furthermore, the broadcast server 13 is connected to a transmission facility that is provided in a transmitting station 31, through a predetermined line such as a dedicated line. The transmission facility in the transmitting station 31 performs necessary processing (for example, modulation processing or the like) with respect to data from the broadcast server 13, and thus, the broadcast wave (the broadcast signal) obtained as a result thereof, is transmitted through the broadcast network. In the following description, for the sake of simplicity of description, the processing to be performed by the transmission facility in the transmitting station 31, will be omitted.

Here, in the DASH client 22, in a case of reproducing desired contents, a segment request is transmitted to the proxy server 21 through the domestic LAN. The proxy server 21 processes the segment request from the DASH client 22, and transmits the processed request to the switching server 12 through the Internet 41.

The switching server 12 determines whether to return a segment response with respect to the segment request through the bidirectional network or the broadcast network, on the basis of the segment request from the proxy server 21.

In a case where it is determined that the segment response is returned through communication, through the bidirectional network, the switching server 12 transmits the segment response (the DASH segment) from the DASH server 11, to the proxy server 21 through the Internet 41.

The proxy server 21 transmits the segment response (the DASH segment) received from the switching server 12, to the DASH client 22 through the domestic LAN. Then, in the DASH client 22, the DASH segment returned through communication, is processed, and desired contents are reproduced.

After that, for example, a situation is assumed in which the number of end users viewing contents being reproduced by the DASH client 22, increases, and the traffic of streaming service of the contents is concentrated, and thus, a large load is applied to the Internet 41.

In this case, the switching server 12 determines to return the segment response with respect to the segment request through the broadcast network in the bidirectional network and the broadcast network, on the basis of the segment request from the proxy server 21. Then, the switching server 12 transfers the segment response (the DASH segment) from the DASH server 11, to the broadcast server 13.

The broadcast server 13 returns the segment response (the DASH segment) from the switching server 12 through broadcast, through the broadcast network. The proxy server 21 receives the segment response (the DASH segment) to be transmitted from the broadcast server 13, according to the tuner.

The proxy server 21 transmits the segment response (the DASH segment) received from the broadcast server 13, to the DASH client 22 through the domestic LAN. Then, in the DASH client 22, the DASH segment returned through broadcast, is processed, and desired contents are reproduced.

Furthermore, in the description of the transmitting and receiving system of FIG. 2, it has been described that the proxy server 21 and the DASH client 22 are provided in the house of the end user, but the proxy server 21 may be provided not only in the house of the end user, but also, for example, in a head end of a cable operator, a base station of a mobile network, or the like, such that a wider region can be covered.

That is, for example, in a case where the proxy server 21 is provided in the head end of the cable operator, the DASH client 22 is provided in the house of each end user subscribing to the service of the cable television, but not in the house of the same end user.

In addition, for example, in a case where the proxy server 21 is provided in the base station of the mobile network, the DASH client 22 is a device (a mobile receiver) possessed by an end user subscribing to mobile service, indoors or outdoors.

(Configuration Example on Transmitting Side)

Figure 3:
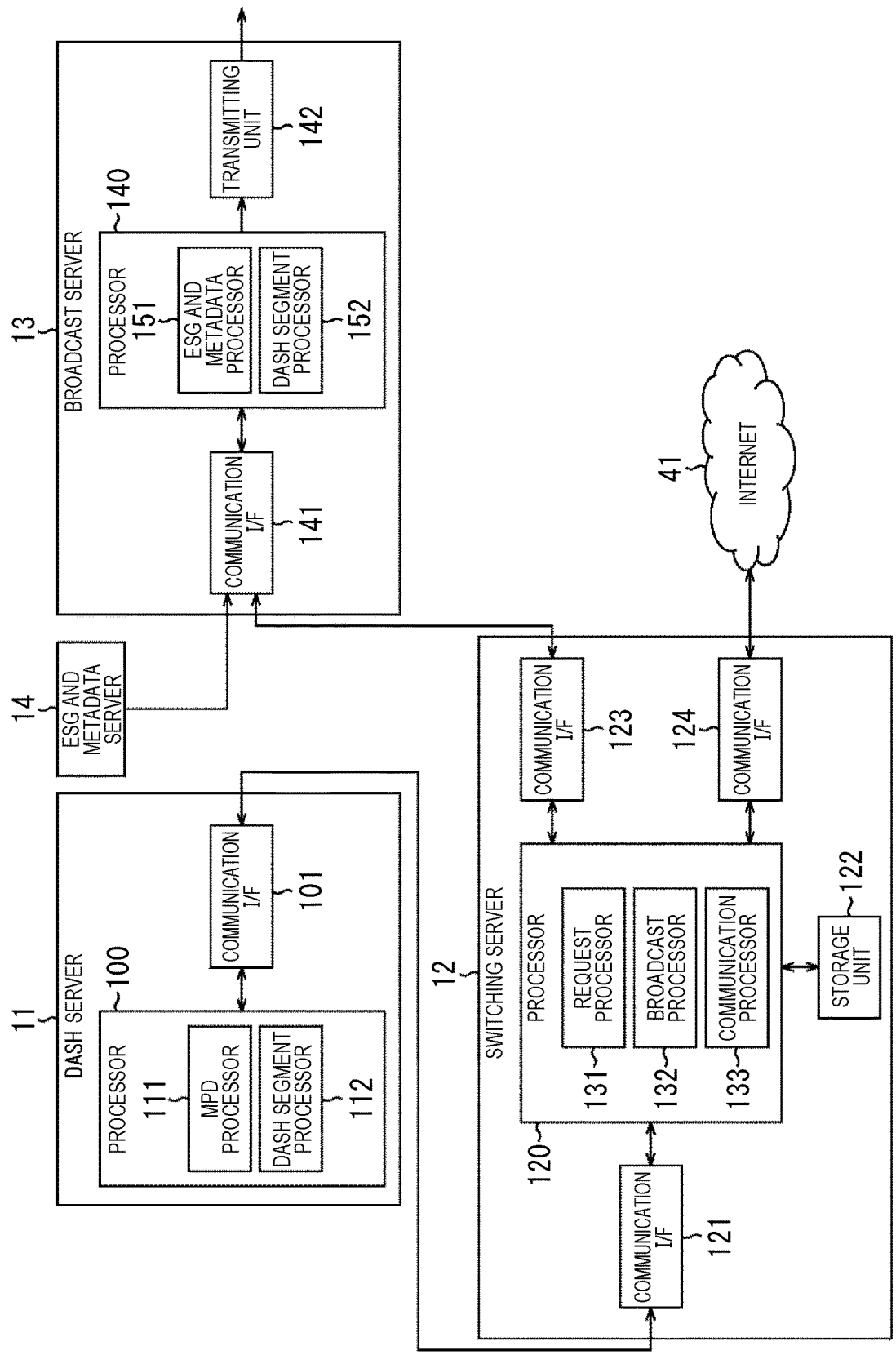
FIG. 3 is a block diagram illustrating a configuration example of each server on a transmitting side.

FIG. 3 is a block diagram illustrating a configuration example of each of the servers on the transmitting side of FIG. 2.

(Configuration Example of DASH Server)

First, a configuration example of the DASH server 11 will be described. The DASH server 11 includes a processor 100 and a communication I/F 101.

The processor 100, for example, includes a central processing unit (CPU), a microprocessor, or the like. The processor 100 is operated as a main processing device in the DASH server 11, performing various arithmetic processings, operational control of each unit, and the like.

The processor 100 includes an MPD processor 111 and a DASH segment processor 112.

The MPD processor 111 performs processing associated with MPD metadata. The DASH segment processor 112 performs processing associated with the DASH segment.

The communication I/F 101, for example, includes a communication interface circuit or the like. The communication I/F 101 exchanges various data items with respect to the switching server 12, through a predetermined communication line.

(Configuration Example of Switching Server)

Next, a configuration example of the switching server 12 will be described. The switching server 12 includes a processor 120, a communication I/F 121, a storage unit 122, a communication I/F 123, and a communication I/F 124.

The processor 120, for example, includes a CPU, a microprocessor, or the like. The processor 120 is operated as a main processing device in the switching server 12, performing various arithmetic processings, operational control of each unit, and the like.

The processor 120 includes a request processor 131, a broadcast processor 132, and a communication processor 133.

The request processor 131 performs processing associated with a request such as the segment request.

The broadcast processor 132 performs processing in a case where a response with respect to a request is returned, in a broadcast return mode. The communication processor 133 performs processing in a case where a response with respect to a request is returned, in a communication return mode.

Furthermore, the details will be described later, but the broadcast return mode is a mode in which the response is returned by using the broadcast network according to the broadcast server 13. In addition, the communication return mode is a mode in which the response is returned by using the Internet 41.

The communication I/F 121, for example, includes a communication interface circuit or the like. The communication I/F 121 exchanges various data items with respect to the DASH server 11, through a predetermined communication line.

The storage unit 122, for example, includes a semiconductor memory, a hard disk drive (HDD), or the like. The storage unit 122 records various data items, according to the control from the processor 120.

The communication I/F 123, for example, includes a communication interface circuit or the like, and exchanges various data items with respect to the broadcast server 13, through a predetermined communication line.

The communication I/F 124, for example, includes a communication interface circuit or the like, and exchanges various data items with respect to the proxy server 21, through the Internet 41.

Furthermore, in FIG. 3, for the sake of convenience of description, it is illustrated that three communication I/Fs of the communication I/F 121, the communication I/F 123, and the communication I/F 124, are provided, but one communication I/F may be provided by integrating such communication I/Fs.

(Configuration Example of Broadcast Server)

Next, a configuration example of the broadcast server 13 will be described. The broadcast server 13 includes a processor 140, a communication I/F 141, and a transmitting unit 142.

The processor 140, for example, includes a CPU, a microprocessor, or the like. The processor 140 is operated as a main processing device in the broadcast server 13, performing various arithmetic processings, operational control of each unit, and the like.

The processor 140 includes an ESG and metadata processor 151 and a DASH segment processor 152.

The ESG and metadata processor 151 performs processing associated with ESG information or metadata such as SLS, to be acquired from an ESG and metadata server 14. The DASH segment processor 152 performs processing associated with the DASH segment.

The communication I/F 141, for example, includes a communication interface circuit or the like. The communication I/F 141 exchanges various data items with respect to the switching server 12, through a predetermined communication line.

The transmitting unit 142 transmits the ESG information, control information, or the like, along with the contents stream (the DASH segment).

Furthermore, in FIG. 2 or FIG. 3, it is illustrated that the DASH server 11, the switching server 12, and the broadcast server 13, on the transmitting side (a server backend side), are configured as a separate device, and are connected to each other according to the bidirectional network, but the DASH server 11, the switching server 12, and the broadcast server 13 may be mounted on the same device.

For example, the DASH server 11, the switching server 12, and the broadcast server 13 can be configured as a dedicated server or the like having the function of the DASH server 11, the function of the switching server 12, and the function of the broadcast server 13. In addition, for example, a combination of servers mounted on the same device, such as a combination of the DASH server 11 and the switching server 12 mounted on the same device, is arbitrary.

(Configuration Example of Receiving Side)

Figure 4:
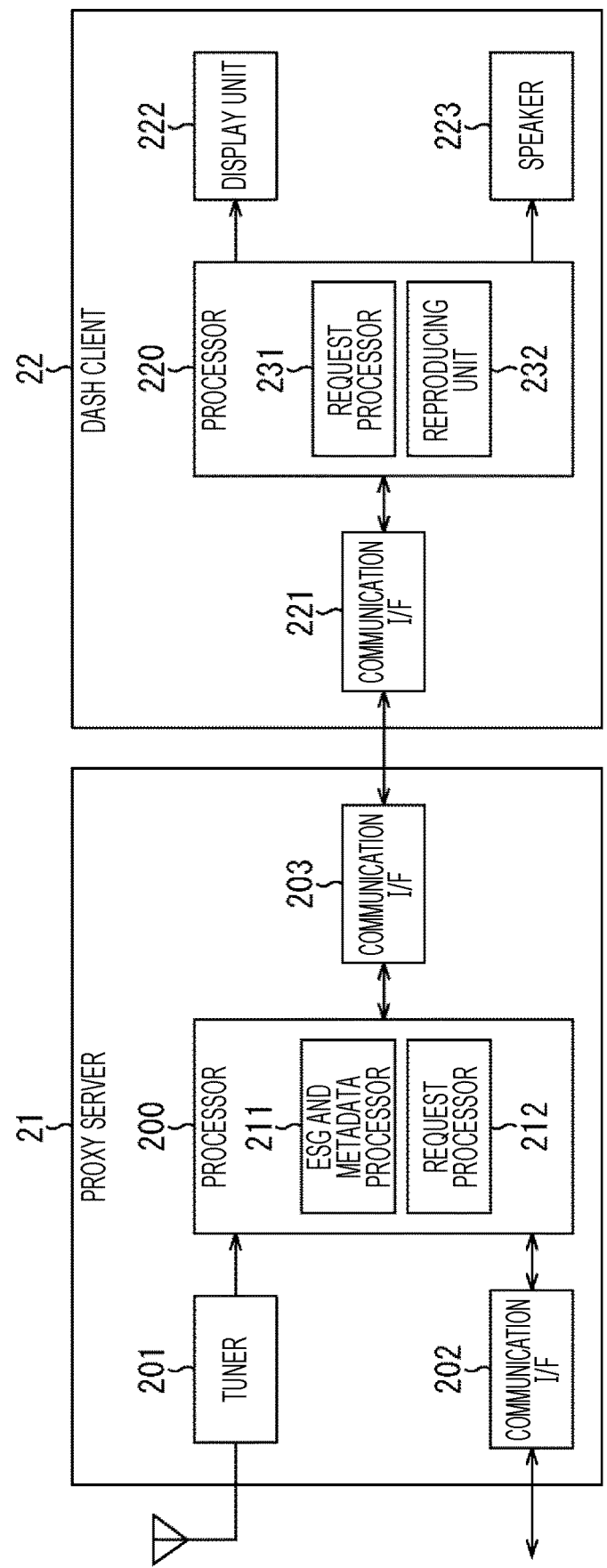
FIG. 4 is a block diagram illustrating a configuration example of each device on a receiving side.

FIG. 4 is a block diagram illustrating a configuration example of each of the devices on the receiving side of FIG. 2.

(Configuration Example of Proxy Server) First, a configuration example of the proxy server 21 will be described. The proxy server 21 includes a processor 200, a tuner 201, a communication I/F 202, and a communication I/F 203.

The processor 200, for example, includes a CPU, a microprocessor, or the like. The processor 200 is operated as a main processing device in the proxy server 21, performing various arithmetic processings, operational control of each unit, and the like.

The processor 200 includes an ESG and metadata processor 211 and a request processor 212.

The ESG and metadata processor 211 performs processing associated with ESG information or metadata such as SLS. The request processor 212 performs processing associated with a request such as the segment request.

The tuner 201 receives and processes the broadcast wave (the broadcast signal) to be transmitted from the broadcast server 13 through an antenna, and supplies data obtained as a result thereof to the processor 200.

The communication I/F 202, for example, includes a communication interface circuit or the like. The communication I/F 202 exchanges various data items with respect to the switching server 12, through the Internet 41.

The communication I/F 203, for example, includes a communication interface circuit or the like, and exchanges various data items with respect to the DASH client 22, through a predetermined communication line (for example, the domestic LAN or the like).

Furthermore, in FIG. 4, for the sake of convenience of description, it is illustrated that two communication I/Fs of the communication I/F 202 and the communication I/F 203, are provided, but one communication I/F may be provided by integrating such communication I/Fs.

(Configuration Example of DASH Client)

Next, a configuration example of the DASH client 22 will be described. The DASH client 22 includes a processor 220, a communication I/F 221, a display unit 222, and a speaker 223.

The processor 220, for example, includes a CPU, a microprocessor, or the like. The processor 220 is operated as a main processing device in the DASH client 22, performing various arithmetic processings, operational control of each unit, and the like.

The processor 220 includes a request processor 231 and a reproducing unit 232.

The request processor 231 performs processing associated with a request such as the segment request. The reproducing unit 232 performs processing associated with the DASH segment, or the like, and thus, reproduces contents.

The display unit 222, for example, includes a display such as a liquid crystal display (LCD) or an organic electroluminescence display (OELD). The display unit 222 displays a screen image corresponding to video data from (the reproducing unit 232 of) the processor 220.

The speaker 223 outputs a sound corresponding to audio data from the processor 220.

Furthermore, in the DASH client 22, in a case where the display unit 222 has a function of a touch panel, a manipulation signal according to the manipulation of the end user with respect to the touch panel, is supplied to the processor 220, and the processor 220 performs processing according to the manipulation signal. In addition, even though it is not illustrated in FIG. 4, an input unit such as a physical button, may be provided, and a manipulation signal according to the manipulation of the end user with respect to the input unit, may be supplied to the processor 220.

In addition, in FIG. 2 or FIG. 4, it is illustrated that the proxy server 21 and the DASH client 22, on the receiving side, are configured as a separate device, and are connected to each other according to the bidirectional network, but the proxy server 21 and the DASH client 22 may be mounted on the same device. For example, the proxy server 21 and the DASH client 22 can be configured as a television set or the like having the function of the proxy server 21 and the function of the DASH client 22.

(Protocol Stack of Present Technology)

Figure 5:
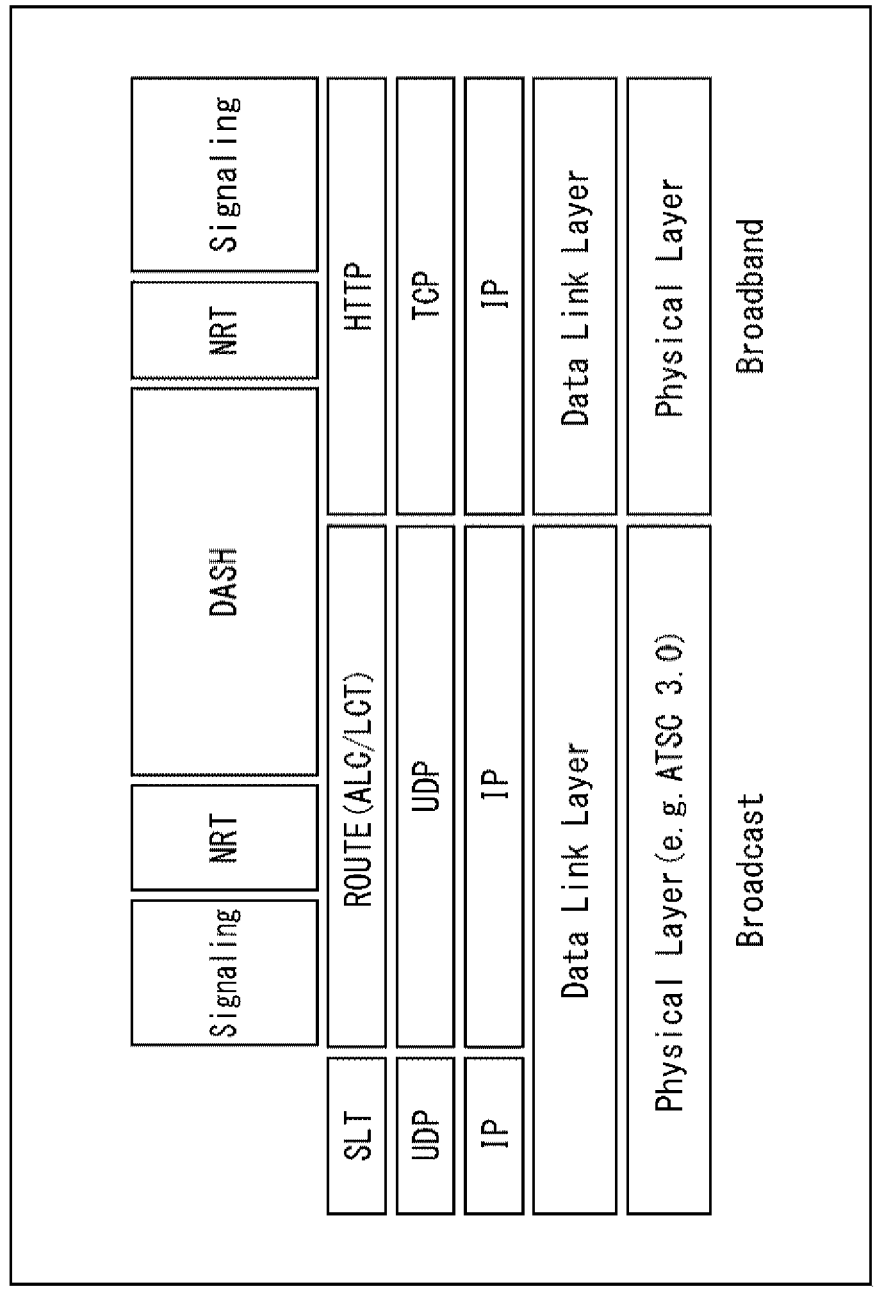
FIG. 5 is a diagram illustrating an example of a protocol stack of an IP transmission system of the present technology.

FIG. 5 is a diagram illustrating an example of a protocol stack of an IP transmission system of the present technology.

In the present state, an MPEG2-transport stream (TS) system has been widely used as a transmission system of digital broadcast, but in the future, an IP transmission system in which an Internet protocol (IP) packet used in the communication field, is used for digital broadcast, is assumed to be widely used.

For example, in advanced television systems committee (ATSC) 3.0 that is one next-generation terrestrial broadcast standard, it is expected that more advanced service can be provided by adopting the IP transmission system. In the present technology, the IP transmission system can be adopted, as with a broadcast system such as ATSC 3.0.

In FIG. 5, the lowest hierarchy is a physical layer. In the digital broadcast of the IP transmission system such as ATSC 3.0, there is a case where a part of data is transmitted not only by using unidirectional broadcast, but also by using bidirectional communication, and in a case of using broadcast, the physical layer corresponds to a frequency band of a broadcast wave allocated for service (a channel), or the like.

An upper hierarchy of the physical layer is a data link layer. In addition, an upper hierarchy of the data link layer is an Internet protocol (IP) layer and a user datagram protocol (UDP) layer. The IP layer and the UDP layer are layers corresponding to a network layer and a transport layer in a hierarchy model of communication, and an IP packet and a UDP packet are specified according to an IP address and a port number.

Here, in ATSC 3.0, it is assumed that low level signaling (LLS) and service layer signaling (SLS) are used as the control information (signaling). The LLS is control information to be transmitted on the lower layer than that of the SLS. The SLS is control information of service unit. That is, in ATSC 3.0, the control information of the transport layer is transmitted in two hierarchies of the LLS and the SLS.

The LLS includes metadata such as a service list table (SLT). The SLT metadata includes basic information indicating the configuration of a stream or broadcast service in the broadcast network, such as information necessary for channel selection of the broadcast service (the channel). The SLT metadata is transmitted by being included in an UDP/IP packet that is the IP packet including the UDP packet. However, the UDP/IP packet storing the SLT metadata, is transmitted by a special IP address and a special port number.

An upper hierarchy adjacent to the IP layer and the UDP layer, is real-time object delivery over unidirectional transport (ROUTE). The ROUTE is a protocol for transferring a streaming file, and is obtained by expanding file delivery over unidirectional transport (FLUTE).

According to such a ROUTE session, a file (signaling) of the SLS, a file (NRT) of non real time (NRT) contents, a DASH segment file (DASH), and the like are transmitted, for each broadcast service.

Here, the SLS is control information of a service level, and provides information, attribute, and the like, necessary for searching and selecting a component belonging to target broadcast service. The SLS includes metadata such as user service bundle description (USBD), service-based transport session instance description (S-TSID), and media presentation description (MPD).

The USBD metadata includes information such as acquisition destination of the other metadata.

The S-TSID metadata is obtained by expanding LCT session instance description (LSID) for ATSC 3.0, and is control information of a ROUTE protocol. In addition, the S-TSID metadata is capable of specifying extended FDT (EFDT) that is transmitted in the ROUTE session. The EFDT is obtained by expanding a file delivery table (FDT) that is introduced by the FLUTE, and is control information for transfer.

The MPD metadata is used for performing streaming delivery based on MPEG-DASH, and is control information of a video file or an audio file.

Here, MPEG-DASH is a streaming deliver standard according to over the top video (OTT-V), and is a standard associated with adaptive streaming delivery using a streaming protocol based on a hypertext transfer protocol (HTTP).

In the MPEG-DASH standard, a manifest file for describing the metadata that is the control information of the video file or the audio file, and a file format for transmitting the contents of a moving image, are defined. Here, the manifest file of the former is referred to as the media presentation description (MPD), and the file format of the latter is referred to as a segment format.

In addition, in a case where the ROUTE is used as the transport protocol, an MP4 file format can be used as a file format of streaming. The MP4 file format is a derived format of an ISO base media file format (ISO BMFF) that is defined in ISO/IEC 14496-12.

A segment to be transmitted in the ROUTE session includes an initialization segment (IS) and a media segment (MS). The initialization segment includes initialization information such as a data compression system. In addition, the media segment stores stream data of a video, a sound, and a caption. That is, the media segment corresponds to the DASH segment (the DASH segment file).

Thus, the stream data of a service component (the video, the sound, the caption, and the like) configuring the contents such as a program, is transmitted according to the ROUTE session in DASH segment unit based on an ISO BMFF standard.

Furthermore, the NRT contents are contents to be reproduced after being accumulated once in a storage of a receiver. In addition, for example, a file other than the NRT contents, such as a file of an application or an electronic service guide (ESG), can be transmitted in the ROUTE session.

In addition, metadata such as the SLT metadata as the LLS, the USBD as the SLS, the S-TSID, and the MPD, for example, can be data in a text format, described by a markup language such as an extensible markup language (XML).

On the other hand, in a case of using the bidirectional communication (Broadband), the upper hierarchy of the physical layer is the data link layer. In addition, the upper hierarchy of the data link layer is the IP layer corresponding to the network layer. The upper hierarchy adjacent to the IP layer, is a transmission control protocol (TCP) layer corresponding to the transport layer, and the upper hierarchy adjacent to the TCP layer, is an HTTP layer corresponding to an application layer.

That is, according to such hierarchies, a protocol such as TCP/IP that is operated through a communication line such as the Internet, is implemented.

In an upper hierarchy adjacent to the HTTP layer, a part of the hierarchy is the control information (the signaling) and the NRT contents (NRT). All of the control information items such as the control information to be transmitted in the ROUTE session, described above, are included as the control information. In addition, the NRT contents are contents to be acquired through communication, and for example, include an application.

In the upper hierarchy adjacent to the HTTP layer, hierarchies other than the hierarchies described above, are the DASH segment (DASH). That is, in streaming delivery of a bidirectional communication system, the stream data of the service component (the video, the sound, the caption, and the like) configuring the contents such as a video on demand (VOD) program, is transmitted in the DASH segment unit based on the ISO BMFF standard.

As described above, in the protocol stack of the IP transmission system of the present technology, a part of a hierarchy of a unidirectional broadcast system and a hierarchy of a bidirectional communication system is a common protocol, and thus, the stream data of the service component configuring the contents can be transmitted in the DASH segment unit based on the ISO BMFF standard, through unidirectional broadcast and bidirectional communication.

For this reason, in a case of performing both of streaming delivery of the unidirectional broadcast system and streaming delivery of the bidirectional communication system, the protocol of the upper hierarchy is commonalized, and thus, it is possible to reduce an implementing load or a processing load in each device.

(Contents of MPD)

Figure 6:
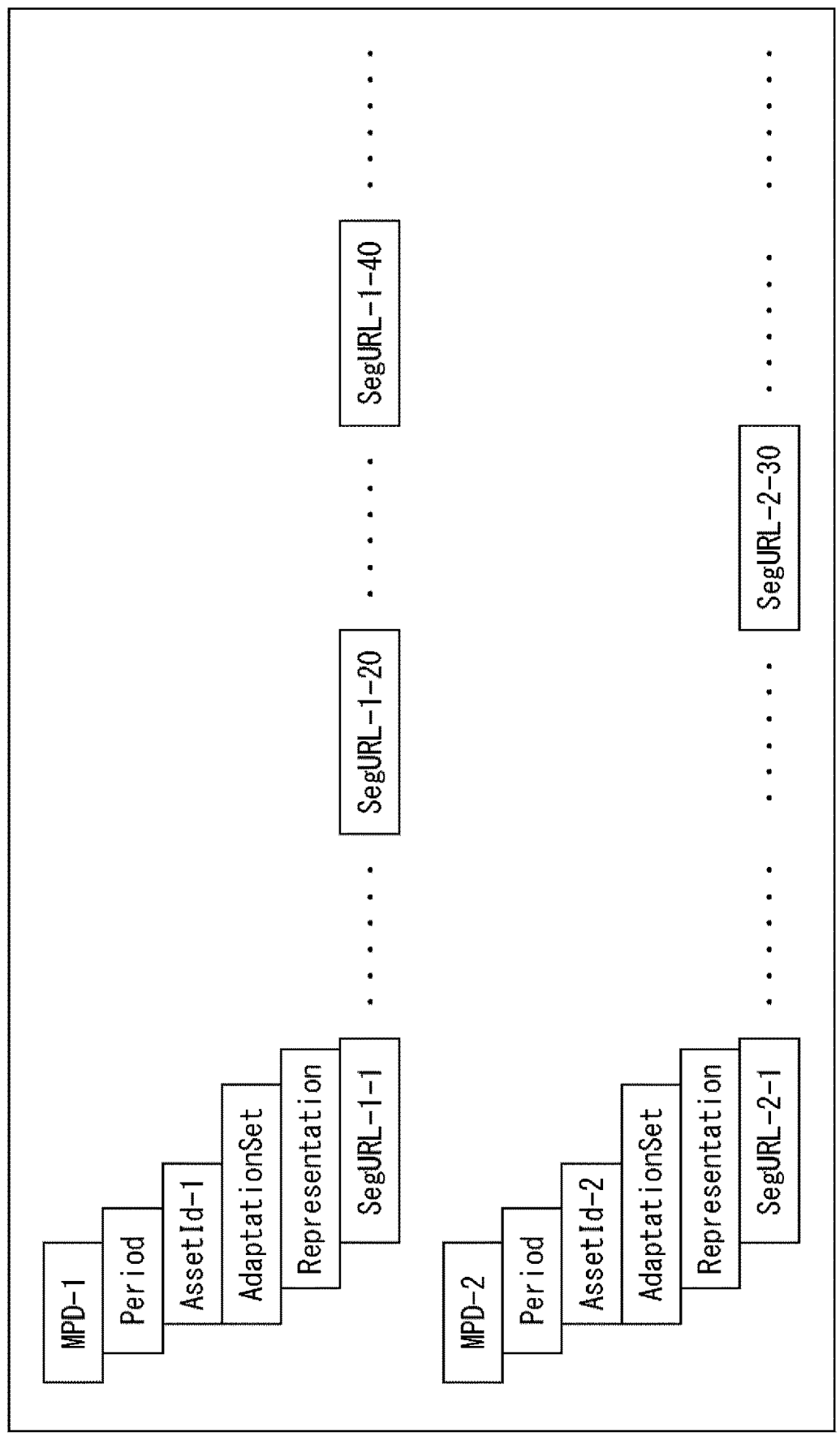
FIG. 6 is a diagram illustrating contents of MPD metadata.

FIG. 6 is a diagram illustrating the contents of the MPD metadata as the SLS.

Here, the MPD metadata configures a hierarchy structure along with a Period element, an AdaptationSet element, and a Representation element.

The Period element is unit for describing the configuration of the contents such as a program. In addition, it is possible to describe identification information of the contents by the AssetIdentifier element.

In addition, the AdaptationSet element and the Representation element are used for each stream of the component configuring the contents such as the video, the sound, and the caption, and are capable of describing the attribute of each of the streams.

The AdaptationSet element corresponds to a stream in which a plurality of streams are multiplexed, in addition to a single stream such as a video stream or a sound stream.

Streams of components that are a plurality of options having different parameters such as a bit rate, can be exemplified as the Representation element, within a range of the AdaptationSet element that is an upper element (a parent element). Furthermore, the contents include one or a plurality of components, and thus, here, a contents stream may be exemplified as the contents.

In FIG. 6, in a case where there are two contents streams, each of the contents streams includes the MPD metadata having a configuration as illustrated by MPD-1 and MPD-2. That is, the first contents have MPD-1, and the second contents have MPD-2.

That is, in the first contents, AssetId-1 to be designated by the AssetIdentifier element, is allocated as the identification information of the contents, whereas in the second contents, AssetId-2 is allocated.

In addition, the DASH segment (the DASH segment file) of the stream of the first contents is identified according to a segment URL that is transitioned as SegURL-1-1, SegURL-1-2, . . . , SegURL-1-20, . . . , SegURL-1-40, . . . .

On the other hand, the DASH segment (the DASH segment file) of the stream of the second contents is identified according to a segment URL that is transitioned as SegURL-2-1, SegURL-2-2, . . . , SegURL-2-30, . . . .

(Description Example of MPD)

FIG. 7 is a diagram illustrating a description example of the MPD metadata (MPD-1) of the first contents illustrated in FIG. 6. That is, FIG. 7 illustrates a description example of XML instance of MPD-1.

In MPD-1, "md:cid:EIDR:10.5240%2f0EFB-02CD-126E-8092-1E49-W" is designated by the AssetIdentifier element, as the value of AssetId-1 illustrated in FIG. 6.

In addition, the value of a SegmentURL element exemplified in a SegmentList element of the Representation element, corresponds to the segment URL such as SegURL-1-1 illustrated in FIG. 6. Specifically, "a-1-1.mp4", "a-1-2.mp4", "a-1-3.mp4", and the like that are a contents part of the SegmentURL element, correspond to SegURL-1-1, SegURL-1-2, SegURL-1-3, and the like.

2. Specific Operation Example (Example of Specific Configuration)

Figure 8:
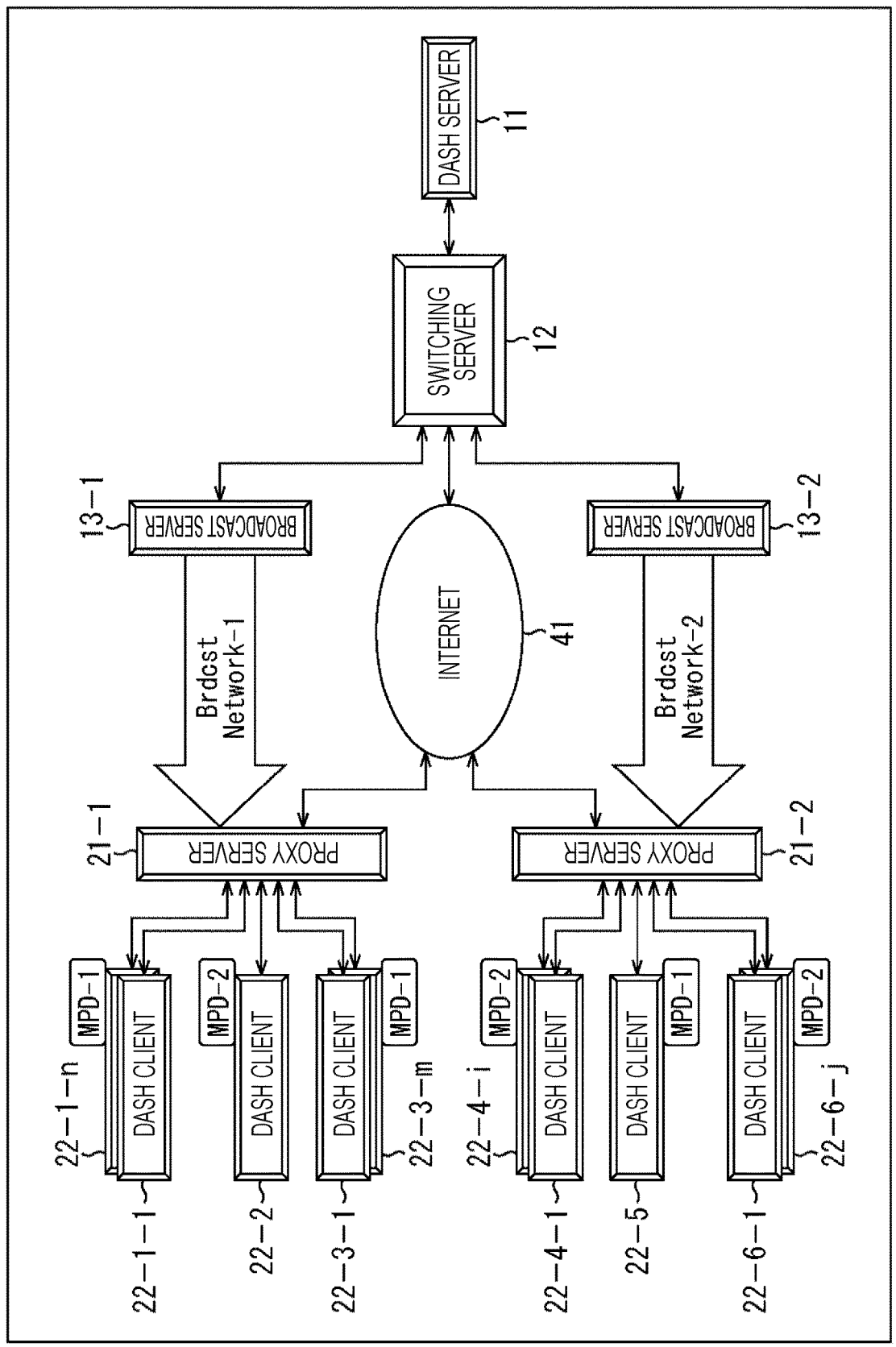
FIG. 8 is a diagram illustrating a specific configuration example of the transmitting and receiving system of FIG. 2.

FIG. 8 is a diagram illustrating a specific configuration example of the transmitting and receiving system of FIG. 2.

In FIG. 8, a plurality of DASH clients 22 issuing the segment request based on MPD-1 and MPD-2, are connected to the bidirectional Internet 41 through proxy servers 21-1 and 21-2.

Specifically, DASH clients 22-1-1 to 22-1-*n* (n: an integer of greater than or equal to 1) issuing the segment request based on MPD-1, a DASH client 22-2 issuing the segment request based on MPD-2, and DASH clients 22-3-1 to 22-3-*m* (m: an integer of greater than or equal to 1) issuing the segment request based on MPD-1, are connected to the proxy server 21-1.

In addition, DASH clients 22-4-1 to 22-4-*i* (i: an integer of greater than or equal to 1) issuing the segment request based on MPD-2, a DASH client 22-5 issuing the segment request based on MPD-1, and DASH clients 22-6-1 to 22-6-*j* (j: an integer of greater than or equal to 1) issuing the segment request based on MPD-2, are connected to the proxy server 21-2.

The switching server 12 is provided in front of the Internet 41 to which the proxy servers 21-1 and 21-2 are connected. The switching server 12 is connected to the DASH server 11. In addition, the switching server 12 is also connected to broadcast servers 13-1 and 13-2.

The broadcast server 13-1 is connected to the proxy server 21-1 through a unidirectional broadcast network BN-1 (BrdcstNetwork-1). In addition, the broadcast server 13-2 is connected to the proxy server 21-2 through a unidirectional broadcast network BN-2 (BrdcstNetwork-2).

(Example of Time Transition of Segment Request)

Figure 9:
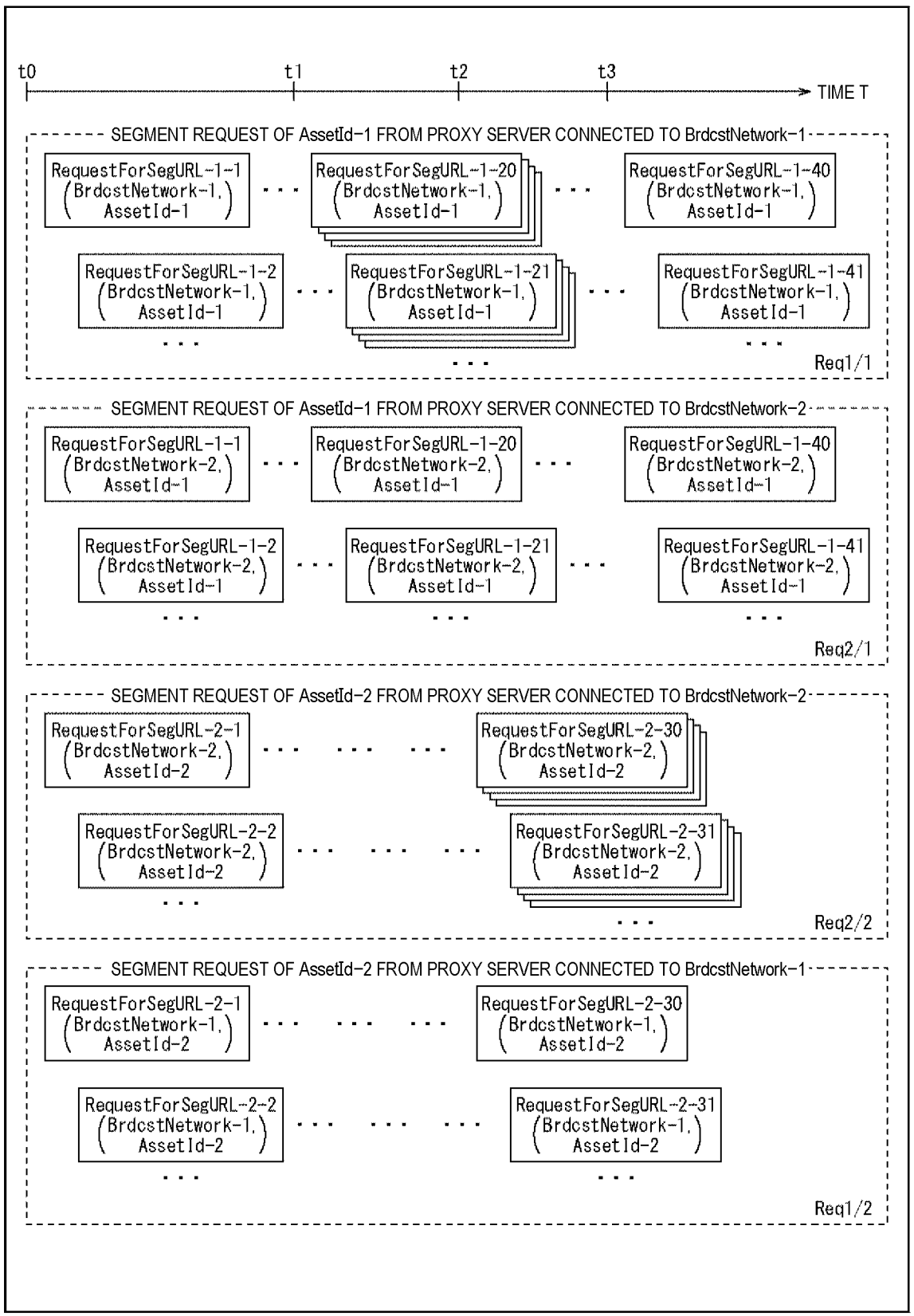
FIG. 9 is a diagram illustrating an example of time transition of a segment request passing through a switching server.

FIG. 9 is a diagram illustrating an example of time transition of the segment request passing through the switching server 12 in a case of adopting the configuration of FIG. 8.

In FIG. 9, the segment request from the proxy server 21 is arranged for each type of segment request, in chronological order of a time T represented in a direction from the left side to the right side of the drawing, within a frame of four dotted lines of the drawing.

Specifically, in the frame of four dotted lines of the drawing, the segment request of two dotted lines on the upper side in the frame, represents time transition of the number of segment requests with respect to contents C-1 of AssetId-1.

A segment request Req1/1 on the upper portion, represents a request of the contents C-1 of AssetId-1 from the proxy server 21-1 that is connected to the broadcast network BN-1 (BrdcstNetwork-1). In addition, a segment request Req2/1 on the lower portion, represents a request of the contents C-1 of AssetId-1 from the proxy server 21-2 that is connected to the broadcast network BN-2 (BrdcstNetwork-2).

Here, focusing on the segment request Req1/1, in the proxy server 21-1 where broadcast streaming to be returned through the broadcast network BN-1, can be received, a request with respect to the segment URL of less than RequestForSegURL-1-40, increases at RequestForSegURL-1-20 and the subsequence of the contents C-1.

In addition, focusing on the segment request Req2/1, in the proxy server 21-2 where broadcast streaming to be returned through the broadcast network BN-2, can be received, a request with respect to a specific segment URL in the contents C-1, does not increase.

For this reason, in the contents C-1 of AssetId-1, it is efficient that the request of RequestForSegURL-1-20 to the request of RequestForSegURL-1-39 are processed according to a broadcast return mode using the broadcast network BN-1 (BrdcstNetwork-1).

On the other hand, in the frame of four dotted lines of the drawing, the segment requests of two dotted lines on the lower side in the frame, represents time transition of the number of segment requests with respect to contents C-2 of AssetId-2.

A segment request Req2/2 on the upper portion, represents a request of the contents C-2 of Asset Id-2 from the proxy server 21-2 that is connected to the broadcast network BN-2 (BrdcstNetwork-2). In addition, a segment request Req1/2 on the lower portion, represents a request of the contents C-2 of AssetId-2 from the proxy server 21-1 that is connected to the broadcast network BN-1 (BrdcstNetwork-1).

Here, focusing on the segment request Req2/2, in the proxy server 21-2 where the broadcast streaming to be returned through the broadcast network BN-2, can be received, a request with respect to the segment URL at RequestForSegURL-2-30 and the subsequence of the contents C-2, increases.

In addition, focusing on the segment request Req1/2, in the proxy server 21-1 where the broadcast streaming to be returned through the broadcast network BN-1, can be received, a request with respect to a specific segment URL in the contents C-2, does not increase.

For this reason, in the contents C-2 of AssetId-2, it is efficient that the request at RequestForSegURL-2-30 and the subsequence is processed according to a broadcast return mode using the broadcast network BN-2 (BrdcstNetwork-2).

(Processing Flow)

Next, a processing flow of the transmitting and receiving system will be described with reference to FIG. 10 to FIG. 13. Here, the processing flow will be described by being divided into four stages.

(First Stage)

Figure 10:
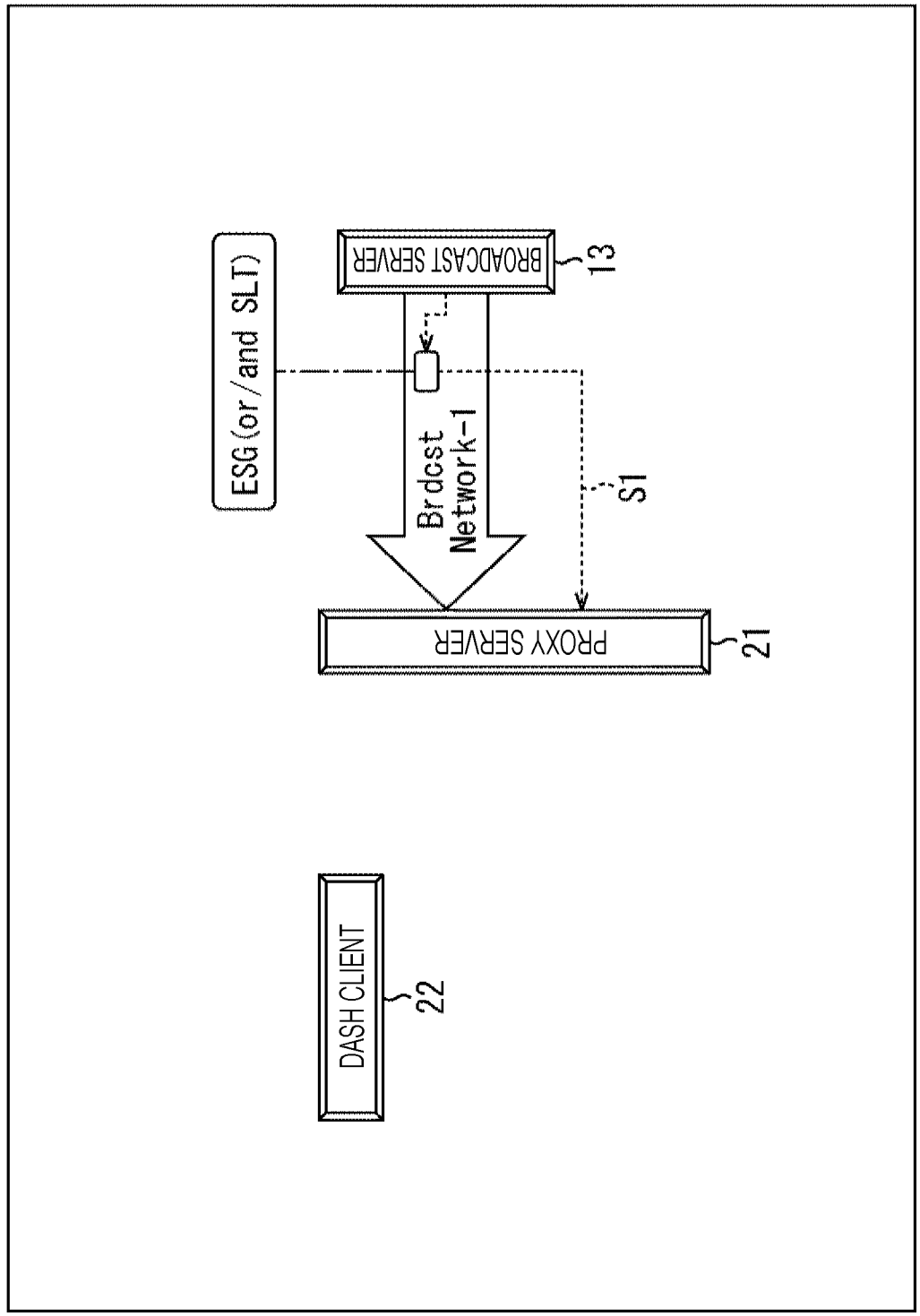
FIG. 10 is a diagram illustrating a processing flow (a first stage).

The first stage of four stages in the processing flow, for example, is illustrated as in FIG. 10.

That is, first, the broadcast server 13 notifies (informs) the proxy server 21 on which the tuner 201 is mounted that broadcast off-loading service is capable of being used in a broadcast wave of a certain area, by using the ESG information or the SLT metadata (S1).

Here, in a case where well-known information is included in the ESG information, it is possible to notify in advance that the broadcast off-loading service is capable of being used. On the other hand, in a case where the well-known information is included in the SLT metadata, it is possible to promptly (barely) notify that the broadcast off-loading service is capable of being used.

In addition, for example, the broadcast wave of the certain area corresponds to the broadcast network BN-1 (BrdcstNetwork-1) or the broadcast network BN-2 (BrdcstNetwork-2). The broadcast network BN-1 (BrdcstNetwork-1) or the broadcast network BN-2 (BrdcstNetwork-2), for example, corresponds to a radio frequency (RF) channel in ATSC 3.0.

Furthermore, there is a case where the ESG information or the SLT metadata is delivered through broadcast, according to the broadcast wave from the broadcast server 13, and there is a case where the ESG information or the SLT metadata is delivered through communication, according to the request from the proxy server 21, through the Internet 41.

(Second Stage)

Figure 11:
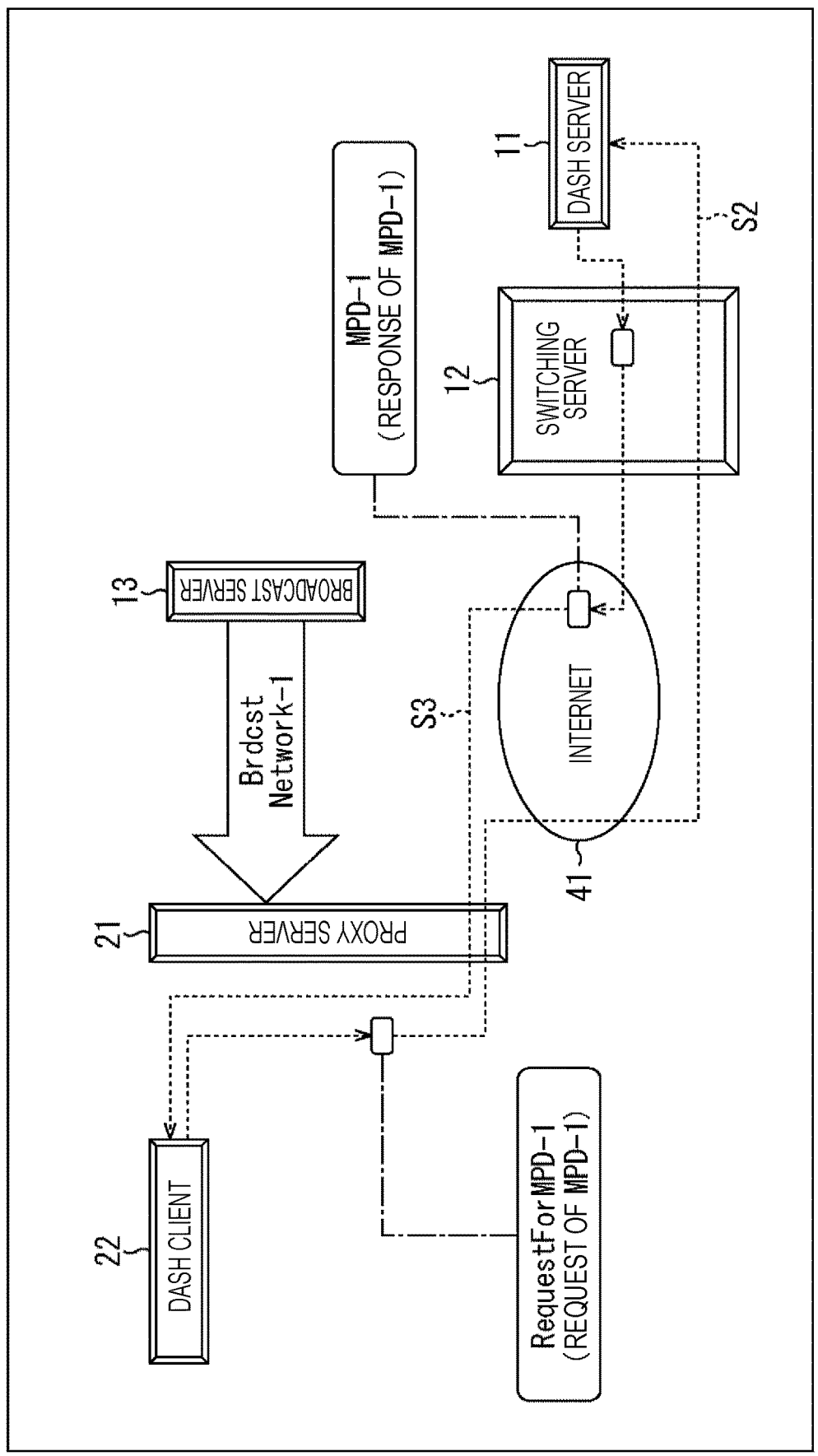
FIG. 11 is a diagram illustrating a processing flow (a second stage).

Next, the second stage of four stages in the processing flow, for example, is illustrated as in FIG. 11.

That is, the DASH client 22 acquires the URL of MPD metadata of desired contents, and makes a request with respect to the DASH server 11.

Here, for example, the proxy server 21 or the DASH client 22 acquires the URL of the MPD metadata by some methods such as access with respect to a Web page of a streaming site that is published on the Internet 41.

An MPD request (RequestForMPD-1) from the DASH client 22, is delivered to the DASH server 11 through the switching server 12, by the proxy server 21 through the Internet 41 (S2).

The DASH server 11 returns an MPD response (MPD-1) with respect to the MPD request from the DASH client 22, to the DASH client 22 through the reverse path.

That is, the MPD response (MPD-1) is delivered to the DASH client 22 through the proxy server 21, by the switching server 12 through the Internet 41 (S3). However, the switching server 12 records the MPD response (MPD-1) from the DASH server 11.

(Third Stage)

Figure 12:
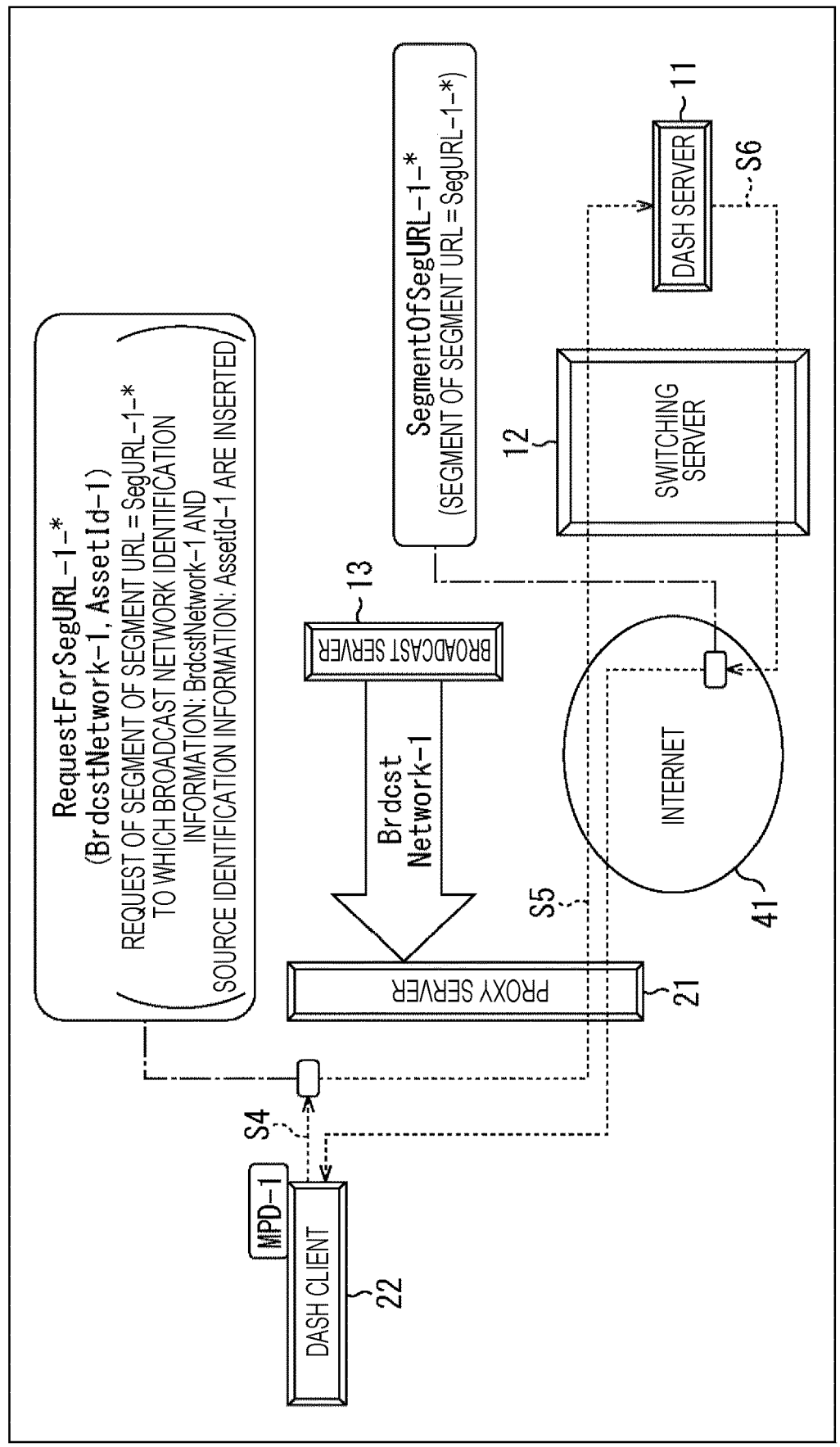
FIG. 12 is a diagram illustrating a processing flow (a third stage).

Next, the third stage of four stages in the processing flow, for example, is illustrated as in FIG. 12.

That is, the DASH client 22 parses the MPD metadata (MPD-1) from the DASH server 11, and requests the DASH segment with respect to the proxy server 21 (S4).

The proxy server 21 inserts source identification information (AssetId-1) with respect to a segment request (RequestForSegURL-1-*) from the DASH client 22.

In addition, the proxy server 21 confirms whether or not the broadcast off-loading service is capable of being used in a broadcast area capable of being received by the proxy server 21 itself, on the basis of the well-known information included in the ESC information or the SLT metadata, illustrated in FIG. 10. In a case where the broadcast off-loading service is capable of being used, the proxy server 21 further inserts broadcast network identification information (BrdcstNetwork-1) with respect to the segment request.

Furthermore, in the proxy server 21, the broadcast area capable of being received by the proxy server 21 itself, is identified according to a broadcast stream ID (BroadcastStreamID: bsid) of the broadcast network BN-1 (BrdcstNetwork-1), and is capable of being used as the broadcast network identification information.

Thus, in a case where the broadcast off-loading service is capable of being used, the segment request (RequestForSegURL-1-*) to which the broadcast network identification information (BrdcstNetwork-1) is inserted in addition to the source identification information (AssetId-1), is generated. On the other hand, in a case where the broadcast off-loading service is not capable of being used, the segment request (RequestForSegURL-1-*) to which only the source identification information (AssetId-1) is inserted, is generated.

Then, the segment request is delivered to the DASH server 11 through the switching server 12, by the proxy server 21 through the Internet 41 (S5).

The DASH server 11 returns the DASH segment with respect to the segment request from the proxy server 21, to the DASH client 22 through the switching server 12 and the proxy server (S6).

Furthermore, in FIG. 12, the number of DASH clients 22 issuing the segment request based on MPD-1 is small, and thus, the proxy server 21 receives the DASH segment to be returned through communication, through the Internet 41, and transfers the received DASH segment to the DASH client 22.

(Fourth Stage)

Figure 13:
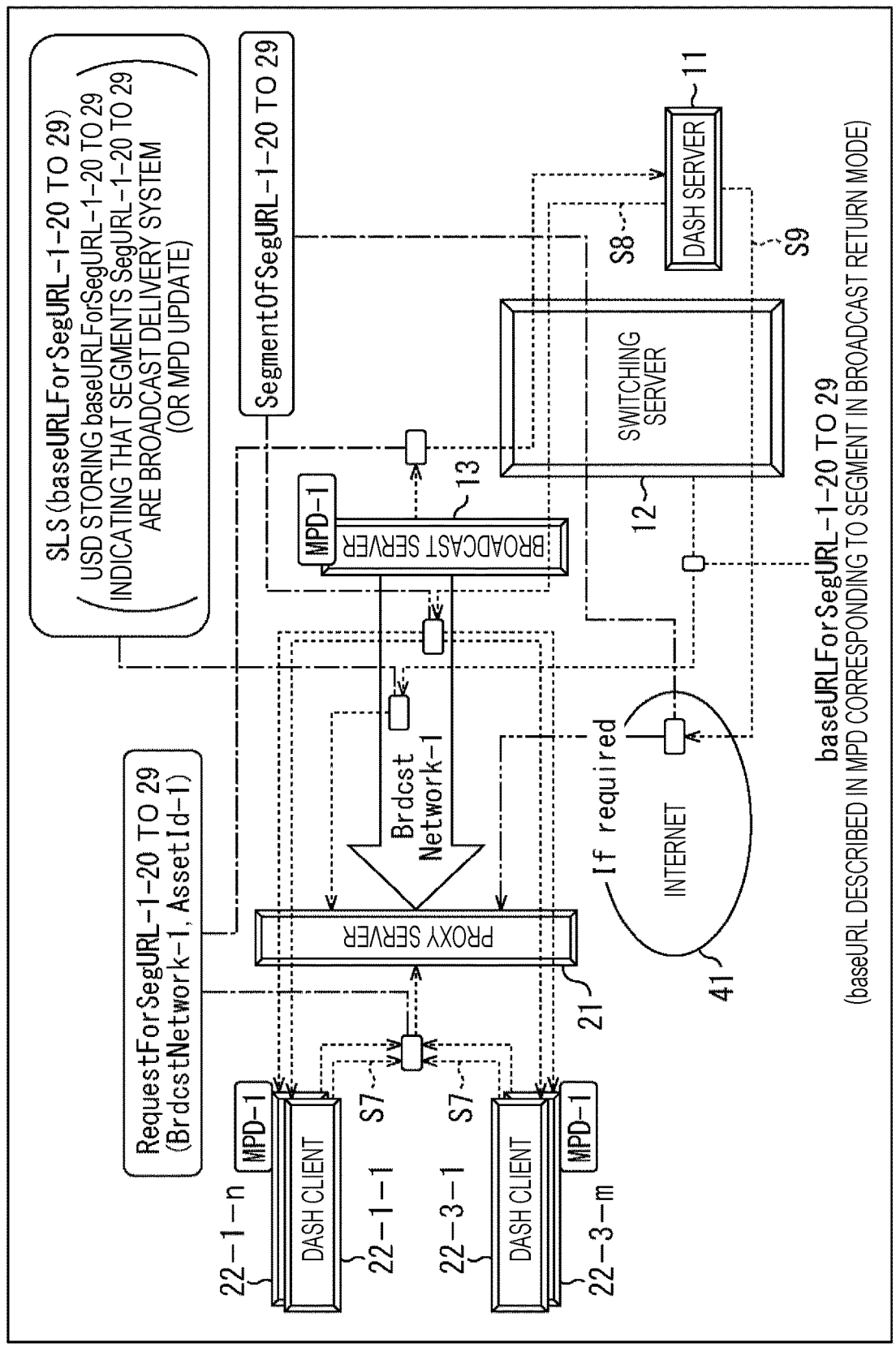
FIG. 13 is a diagram illustrating a processing flow (a fourth stage).

Next, the fourth stage of four stages in the processing flow, for example, is illustrated as in FIG. 13.

That is, the switching server 12 monitors the segment requests from the plurality of DASH clients 22 (22-1-1 to 22-1-n and 22-3-1 to 22-3-m), to be transmitted through the proxy server 21.

Furthermore, in the fourth stage of FIG. 13, the number of DASH clients 22 that are connected to the proxy server 21, and issue the segment request based on MPD-1, increases, compared to the third stage illustrated in FIG. 12.

Then, the switching server 12 does not return the DASH client with respect to an area on which a segment request with respect to a certain DASH segment is concentrated, through the Internet 41, but asks a broadcast network covering the area to broadcast the DASH segment.

For example, in the time transition of the segment request illustrated in FIG. 9, described above, a case is assumed in which the plurality of DASH clients 22 existing in an area where the same broadcast network BN-1 (BrdcstNetwork-1) can be received, request the segment URL that is RequestForSegURL-1-20 to 29 derived from the MPD metadata (MPD-1) (S7).

Furthermore, the broadcast network identification information (BrdcstNetwork-1) is inserted with respect to the segment request (the segment request Req1/1) by the proxy server 21, along with the source identification information (AssetId-1).

In this case, the switching server 12 determines a return mode of the response (the DASH segment), according to a predetermined condition, on the basis of the source identification information (AssetId-1) and the broadcast network identification information (BrdcstNetwork-1), included in the segment request Req1/1 from the proxy server 21.

That is, for example, in the switching server 12, the number of requests of the segment request is counted for each contents (source) to be identified by the source identification information, by providing a specified measurement period. Then, in a case where a count value is greater than or equal to a threshold value set in advance, the response (the DASH segment) with respect to the segment request including the subsequent corresponding source identification information, is returned by using the broadcast network BN-1 (BrdcstNetwork-1) (S8).

In other words, in a case where the switching server 12 determines that it is preferable to return the response (the DASH segment) with respect to the segment request, through the broadcast network, from the viewpoint of efficiently using a network resource (cost saving), the response is returned by using the broadcast network. That is, the response (the DASH segment) is returned in the broadcast return mode.

At this time, the switching server 12 asks the broadcast server 13 to notify (inform) the proxy server 21 side of the existence of DASH segment from the contents (the source) to be returned in the broadcast return mode, by the SLS (the USBD metadata).

Here, the switching server 12 instructs the broadcast server 13 to store the corresponding base URL in the SLS (the USBD metadata) from the segment URL of the DASH segment with many requests, with reference to the recorded MPD metadata.

Furthermore, a method of updating and providing notification of the MPD metadata in advance regardless of a flag according to such USBD metadata, and of explicitly describing the return through broadcast or the return through communication, within the MPD metadata, may be adopted. Here, for example, a method of defining a rule in advance in which a base URL (a relative URL or the like, starting with "/" or the like) is used in a case of the return through broadcast, and an absolute URL is used in a case of the return through communication, can be used.

In addition, the switching server 12 notifies the broadcast server 13 of the MPD metadata, as the SLS, along with the USBD metadata.

Here, a DASH segment corresponding to a source set to the broadcast return mode, is prepared for a case where the proxy server 21 fails to perform reception through broadcast, and it is desirable that the return through communication can also be performed.

Specifically, in the corresponding DASH segment, (the processor 120 of) the switching server 12 decompresses a cache copy in a contents delivery network (CDN) on the Internet 41, and thus, is capable of preparing for the return through communication.

In addition, in a case where target contents are set to the source of the broadcast return mode once, the subsequent DASH segment belonging to the source does not have the segment request from the DASH client 22, but the broadcast server 13 issues the segment request with respect to the DASH server 11 through the switching server 12, on the basis of the MPD metadata given in notification from the switching server 12.

In contrast, the DASH server 11 returns the response (the DASH segment) with respect to the segment request, to the broadcast server 13 through the switching server 12. Then, the broadcast server 13 receives the response (the DASH segment) from the DASH server 11, and returns the DASH segment by using the broadcast network (BrdcstNetwork-1).

The broadcast server 13 continuously issues the segment request with respect to the DASH server 11, to the end of the MPD metadata or until the Period element is ended, on the basis of the MPD metadata. Then, in a case where the return in the broadcast return mode is ended, the broadcast server 13 eliminates the corresponding base URL from the SLS (the USBD metadata), and delivers the updated SLS (USBD metadata).

Furthermore, in a case where the MPD metadata is updated and given in notification in advance, regardless of the flag according to such USBD metadata, and the return through broadcast or the return through communication is explicitly described within the MPD metadata, for example, the base URL (the relative URL or the like, starting with "/" or the like) indicating a case of the return through broadcast, is eliminated.

On the other hand, in a case where the DASH segment is requested from the DASH client 22, the proxy server 21 on the receiving side, confirms whether or not it is the source set in the broadcast return mode, with reference to the newest SLS (USBD metadata), and determines whether to acquire the DASH segment through broadcast or through communication.

For example, it is confirmed whether or not the initial part of the segment URL corresponding to the segment request, is coincident to a part (or all) of the URL exemplified in "bundleDescriptionROUTE/userServiceDescription/deliveryMethod/broadcastAppService/basePattern" (a coincident pattern of a URL for broadcast delivery), and thus, it is possible to determine the acquisition through broadcast or the acquisition through communication.

Furthermore, in a case where the return through broadcast or the return through communication is explicitly described within the MPD metadata, regardless of the flag according to such USBD metadata, the proxy server 21 is capable of determining the acquisition through broadcast or the acquisition through communication, on the basis of the MPD metadata. Here, for example, a rule is defined in advance in which the base URL (the relative URL or the like, starting with "/" or the like) is used in a case of the return through broadcast, and the absolute URL is used in a case of the return through communication.

Then, in a case of performing the acquisition through broadcast, the proxy server 21 processes data to be returned by using the broadcast network (BrdcstNetwork-1) from the broadcast server 13, according to a ROUTE module or the like, and transmits the segment file (the DASH segment) obtained as a result thereof, to the DASH client 22.

On the other hand, in a case of performing the acquisition through communication, the proxy server 21 exchanges the request and the response with respect to the DASH server 11 through the switching server 12, through the Internet 41, and thus, acquires the segment file (the DASH segment), and transmits the acquired segment file to the DASH client 22 (S9).

As described above, the processing flow of the transmitting and receiving system has been described.

3. Example of Request/Response Traffic

Next, response traffic according to the time transition of the segment request illustrated in FIG. 9 described above, will be described with reference to FIG. 14 to FIG. 17.

(Traffic of First Period)

First, request/response traffic of the segment in a first period (a time t0 to a time t1), will be described with reference to FIG. 14.

Figure 14:
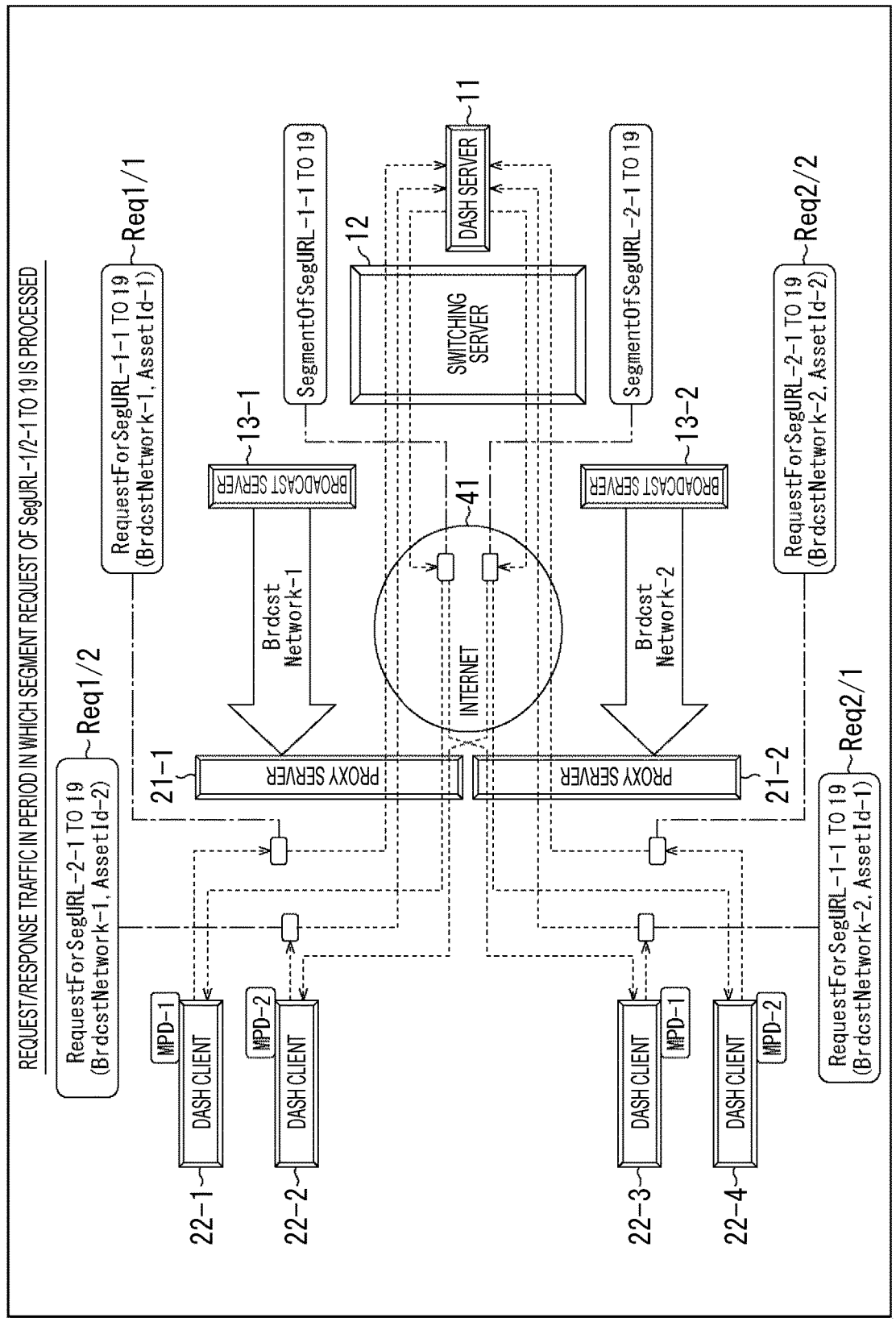
FIG. 14 is a diagram illustrating a request/response traffic (a first period) of a segment.

Furthermore, in FIG. 14, the proxy server 21-1 exists within in a broadcast area of the broadcast server 13-1, and is capable of receiving the segment file (the DASH segment) from the broadcast server 13-1, through the unidirectional broadcast network BN-1 (BrdcstNetwork-1).

The DASH client 22-1 issuing the segment request based on MPD-1, and the DASH client 22-2 issuing the segment request based on MPD-2 are connected to the proxy server 21-1. Further, the proxy server 21-1 is connected to the switching server 12 through the Internet 41.

In addition, in FIG. 14, the proxy server 21-2 exists within a broadcast area of the broadcast server 13-2, and is capable of receiving the segment file (the DASH segment) from the broadcast server 13-2, through the unidirectional broadcast network BN-2 (BrdcstNetwork-2).

The DASH client 22-3 issuing the segment request based on. MPD-1, and the DASH client 22-4 issuing the segment request based on MPD-2 are connected to the proxy server 21-2. Further, the proxy server 21-2 is connected to the switching server 12 through the Internet 41.

Here, the first period corresponds to the time t0 to the time t1 illustrated in FIG. 9, and the segment request to be processed by the switching server 12 within the first period, is RequestForSegURL-1-1 to RequestForSegURL-1-19, and RequestForSegURL-2-1 to RequestForSegURL-2-19.

In FIG. 14, RequestForSegURL-1-1 to RequestForSegURL-1-19 of FIG. 9, correspond to the segment request Req1/1 and the segment request Req2/1.

That is, the segment request Req1/1 is a segment request from the DASH client 22-1, and the broadcast network identification information (BrdcstNetwork-1) of the broadcast network BN-1, and the source identification information (AssetId-1) of the contents C-1 are inserted by the proxy server 21-1.

In addition, the segment request Req2/1 is a segment request from the DASH client 22-3, and the broadcast network identification information (BrdcstNetwork-2) of the broadcast network BN-2, and the source identification information (AssetId-1) of the contents C-1 are inserted by the proxy server 21-2.

On the other hand, in FIG. 14, RequestForSegURL-2-1 to RequestForSegURL-2-19 of FIG. 9 correspond to the segment request Req1/2 and the segment request Req2/2.

That is, the segment request Req1/2 is a segment request from the DASH client 22-2, and the broadcast network identification information (BrdcstNetwork-1) of the broadcast network BN-1, and the source identification information (AssetId-2) of the contents C-2 are inserted by the proxy server 21-1.

In addition, the segment request Req2/2 is a segment request from the DASH client 22-4, and the broadcast network identification information (BrdcstNetwork-2) of the broadcast network BN-2, and the source identification information (AssetId-2) of the contents C-2 are inserted by the proxy server 21-2.

Such segment requests Req1/1, Req2/1, Req1/2, and Req2/2 are received by the switching server 12 through the Internet 41. The switching server 12 determines the return mode of the response (the DASH segment), according to a predetermined condition, on the basis of the network identification information and the source identification information, obtained from the segment requests Req1/1, Req2/1, Req1/2, and Req2/2.

Here, in each of the segment requests, the request with respect to a specific segment URL does not increase, and thus, the switching server 12 determines that it is not necessary to use the broadcast off-loading service, and returns all of the segment responses (DASH segments) in the communication return mode.

The switching server 12 acquires the DASH segment according to the segment requests Req1/1 and Req1/2, which is the DASH segment corresponding to the source set in the communication return mode, from the DASH server 11, and transmits the acquired DASH segment to the proxy server 21-1 through the Internet 41.

Then, the proxy server 21-1 transmits the DASH segment (the DASH segment according to the segment request Req1/1) received through communication from the switching server 12, to the DASH client 22-1. In addition, the proxy server 21-1 transmits the DASH segment (the DASH segment according to the segment request Req1/2) received through communication from the switching server 12, to the DASH client 22-2.

On the other hand, the switching server 12 acquires the DASH segment according to the segment requests Req2/1 and Req2/2, which is the DASH segment corresponding to the source set in the communication return mode, from the DASH server 11, and transmits the acquired DASH segment to the proxy server 21-2 through the Internet 41.

Then, the proxy server 21-2 transmits the DASH segment (the DASH segment according to the segment request Req2/1) received through communication from the switching server 12, to the DASH client 22-3. In addition, the proxy server 21-2 transmits the DASH segment (the DASH segment according to the segment request Req2/2) received through communication from the switching server 12, to the DASH client 22-4.

As described above, in the first period (the time t0 to the time t1), the traffic of the streaming service is not concentrated, and thus, all of the responses with respect to the segment requests (Req1/1, Req2/1, Req1/2, and Req2/2), are returned through communication, through the Internet 41.

(Traffic of Second Period) Next, the request/response traffic of the segment in a second period (a time t1 to a time t2), will be described with reference to FIG. 15.

In the second period, the segment request to be processed by the switching server 12, is RequestForSegURL-1-20 to RequestForSegURL-1-29, and RequestForSegURL-2-20 to RequestForSegURL-2-29.

Figure 15:
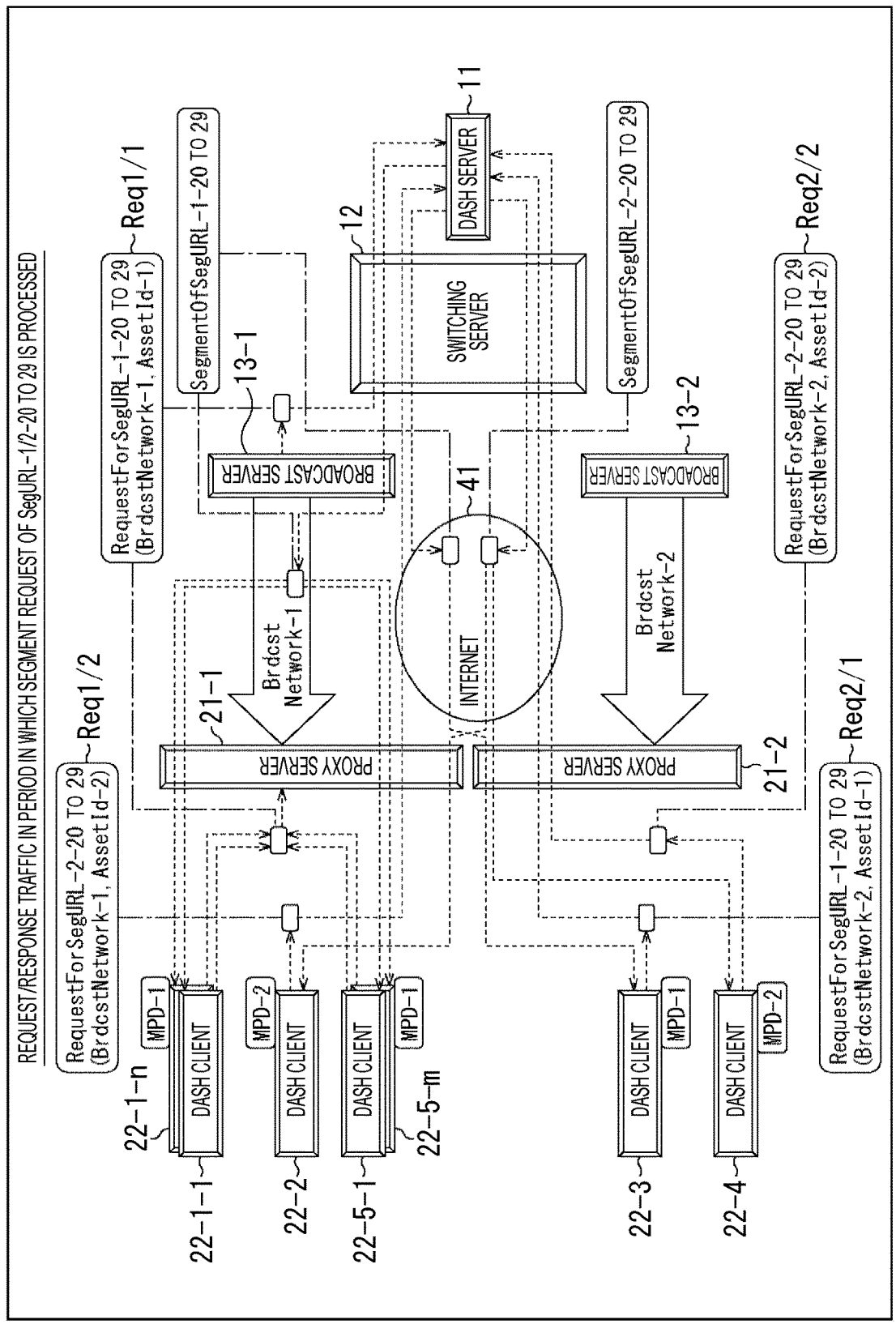
FIG. 15 is a diagram illustrating a request/response traffic (a second period) of the segment.

In the second period of FIG. 15, in the DASH clients 22 connected to the proxy server 21-1, the DASH client 22 issuing the segment request based on MPD-1 increases to the DASH clients 22-1-1 to 22-1-*n* (n: an integer of greater than or equal to 1), and 22-5-1 to 22-5-*m* (m: an integer of greater than or equal to 1), from the DASH client 22-1, compared to the first period of FIG. 14.

However, there is no increase and decrease in the DASH client 22 issuing the segment request based on MPD-2 in the DASH clients 22 connected to the proxy server 21-1, and the DASH client 22 issuing the segment request based on MPD-1 and MPD-2 in the DASH clients 22 connected to the proxy server 21-2.

In such a configuration, the segment requests Req1/1, Req2/1, Req1/2, and Req2/2 are received by the switching server 12 through the Internet 41. The switching server 12 determines the return mode of the response (the DASH segment), according to a predetermined condition, on the basis of the network identification information and the source identification information, obtained from the segment requests Req1/1, Req2/1, Req1/2, and Req2/2.

Here, in the segment request Req1/1, the request with respect to a specific segment URL increases, and thus, the switching server 12 determines that it is preferable to return the response (the DASH segment) with respect to the segment request Req1/1, by using the broadcast off-loading service, from the viewpoint of efficiently using the network resource. That is, the response (the DASH segment) with respect to the segment request Req1/1, is returned in the broadcast return mode.

On the other hand, in the segment requests Req2/1, Req1/2, and Req2/2, the request with respect to a specific segment URL does not increase, and thus, the switching server 12 determines that it is not necessary to use the broadcast off-loading service in the response (the DASH segment) with respect to the segment requests Req2/1, Req1/2, and Req2/2. That is, the response (the DASH segment) with respect to the segment requests Req2/1, Req1/2, and Req2/2, is returned in the communication return mode.

The switching server 12 acquires the DASH segment according to the segment request Req1/1, which is the DASH segment corresponding to the source set in the broadcast return mode, from the DASH server 11, and transmits the acquired DASH segment to the broadcast server 13-1. Then, the broadcast server 13-1 transmits the DASH segment to the proxy server 21-1 through the broadcast network BN-1 (BrdcstNetwork-1).

In addition, the switching server 12 acquires the DASH segment according to the segment request Req1/2, which is the DASH segment corresponding to the source set in the communication return mode, from the DASH server 11, and transmits the acquired DASH segment to the proxy server 21-1 through the Internet 41.

Then, the proxy server 21-1 transmits the DASH segment (the DASH segment according to the segment request Req1/1) received through broadcast from the broadcast server 13-1, to each of the DASH clients 22-1-1 to 22-1-*n*, and 22-5-1 to 22-5-*m*. In addition, the proxy server 21-1 transmits the DASH segment (the DASH segment according to the segment request Req1/2) received through communication from the switching server 12, to the DASH client 22-2.

On the other hand, the switching server 12 acquires the DASH segment according to the segment requests Req2/1 and Req2/2, which is the DASH segment corresponding to the source set in the communication return mode, from the DASH server 11, and transmits the acquired DASH segment to the proxy server 21-2 through the Internet 41.

Then, the proxy server 21-2 transmits the DASH segment (the DASH segment according to the segment request Req2/1) received through communication from the switching server 12, to the DASH client 22-3. In addition, the proxy server 21-2 transmits the DASH segment (the DASH segment according to the segment request Req2/2) received through communication from the switching server 12, to the DASH client 22-4.

As described above, in the second period (the time t1 to the time t2), in the segment request Req1/1, the request with respect to the specific segment URL increases, and the traffic of the streaming service is concentrated, and thus, the response with respect to the segment request Req1/1 is returned through broadcast, by using the broadcast off-loading service.

In addition, in the segment requests Req2/1, Req1/2, and Req2/2, the traffic of the streaming service is not concentrated, and thus, the response with respect to the segment requests (Req2/1, Req1/2, and Req2/2) is returned through communication, through the Internet 41, as with the first period of FIG. 14.

(Traffic of Third Period)

Next, the request/response traffic in a third period (a time t2 to a time t3), will be described with reference to FIG. 16.

In the third period, the segment request to be processed by the switching server 12, is RequestForSegURL-1-30 to RequestForSegURL-1-39, and RequestForSegURL-2-30 to RequestForSegURL-2-39.

Figure 16:
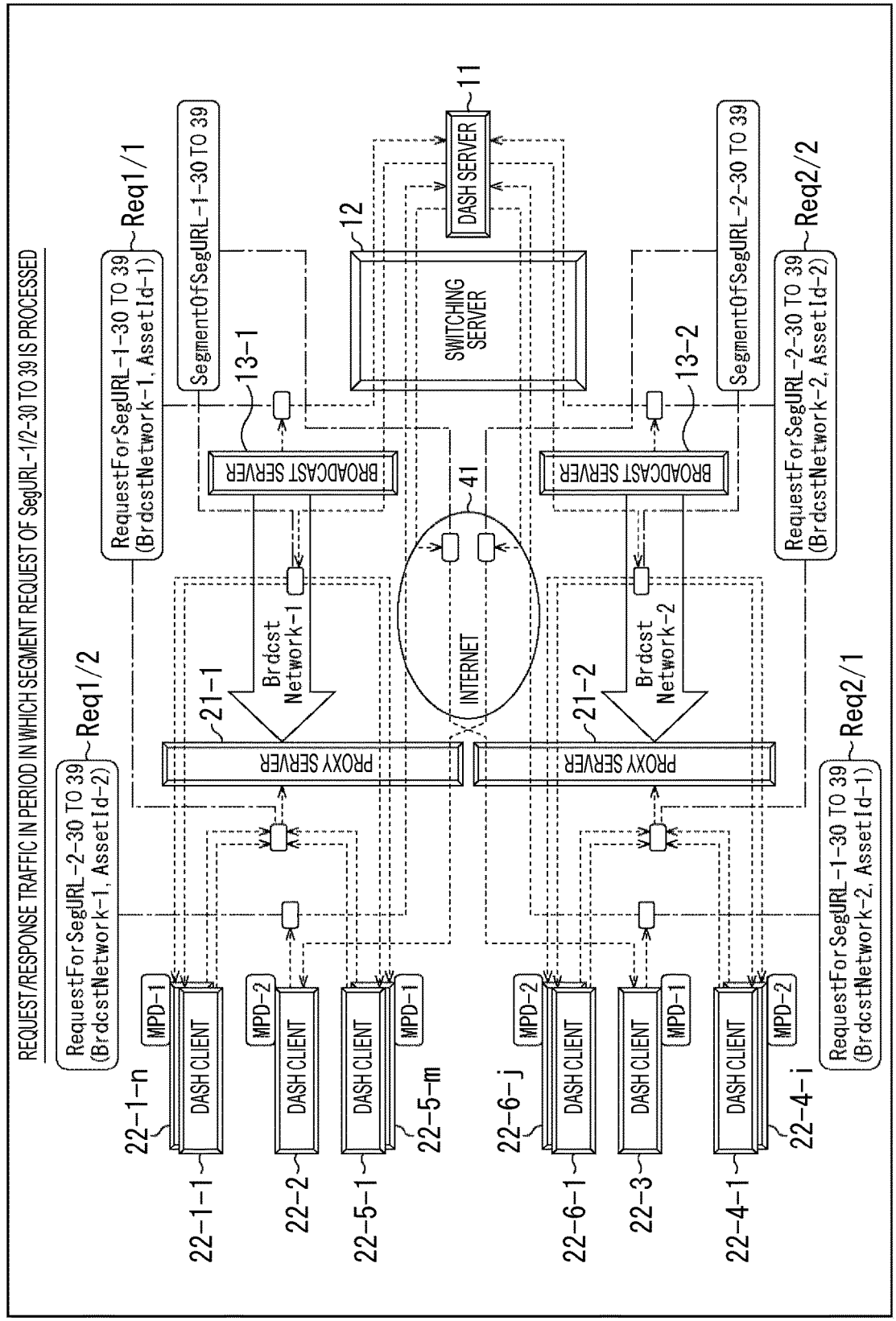
FIG. 16 is a diagram illustrating a request/response traffic (a third period) of the segment.

In the third period of FIG. 16, in the DASH clients 22 connected to the proxy server 21-2, the DASH client 22 issuing the segment request based on MPD-2 increases to DASH clients 22-4-1 to 22-4-*i* (i: an integer of greater than or equal to 1), and 22-6-1 to 22-6-*j* (j: an integer of greater than or equal to 1), from the DASH client 22-4, compared to the second period of FIG. 15.

However, there is no increase and decrease in the DASH client 22 issuing the segment request based on MPD-1 in the DASH clients 22 connected to the proxy server 21-2, and the DASH client 22 issuing the segment request based on MPD-1 and MPD-2 in the DASH clients 22 connected to the proxy server 21-1.

In such a configuration, the segment requests Req2/1, Req1/2, and Req2/2 are received by the switching server 12 through the Internet 41. The switching server 12 determines the return mode of the response (the DASH segment), according to a predetermined condition, on the basis of the network identification information and the source identification information, obtained from the segment requests Req2/1, Req1/2, and Req2/2.

Here, in the segment request Req2/2, the request with respect to a specific segment URL increases, and thus, the switching server 12 determines that it is preferable to return the response (the DASH segment) with respect to the segment request Req2/2, by using the broadcast off-loading service, from the viewpoint of efficiently using the network resource. That is, the response (the DASH segment) with respect to the segment request Req2/2, is returned in the broadcast return mode.

On the other hand, in the segment requests Req2/1 and Req1/2, the request with respect to a specific segment URL does not increase, and thus, the switching server 12 determines that it is not necessary to use the broadcast off-loading service in the response (the DASH segment) with respect to the segment requests Req2/1 and Req1/2. That is, the response (the DASH segment) with respect to the segment requests Req2/1 and Req1/2 is returned in the communication return mode.

Furthermore, in the third period of FIG. 16, the broadcast return mode is continued with respect to the segment request Req1/1, as with the second period of FIG. 15.

The switching server 12 acquires the DASH segment according to the segment request Req1/1, which is the DASH segment corresponding to the source set in the broadcast return mode, from the DASH server 11, and transmits the acquired DASH segment to the broadcast server 13-1. Then, the broadcast server 13-1 transmits the DASH segment to the proxy server 21-1 through the broadcast network BN-1 (BrdcstNetwork-1).

In addition, the switching server 12 acquires the DASH segment according to the segment request Req1/2, which is the DASH segment corresponding to the source set in the communication return mode, from the DASH server 11, and transmits the acquired DASH segment to the proxy server 21-1 through the Internet 41.

Then, the proxy server 21-1 transmits the DASH segment (the DASH segment according to the segment request Req1/1) received through broadcast from the broadcast server 13-1, to each of the DASH clients 22-1-1 to 22-1-*n*, and 22-5-1 to 22-5-*m*. In addition, the proxy server 21-1 transmits the DASH segment (the DASH segment according to the segment request Req1/2) received through communication from the switching server 12, to the DASH client 22-2.

On the other hand, the switching server 12 acquires the DASH segment according to the segment request Req2/2, which is the DASH segment corresponding to the source set in the broadcast return mode, from the DASH server 11, and transmits the acquired DASH segment to the broadcast server 13-2. Then, the broadcast server 13-2 transmits the DASH segment to the proxy server 21-2 through the broadcast network BN-2 (BrdcstNetwork-2).

In addition, the switching server 12 acquires the DASH segment according to the segment request Req2/1, which is the DASH segment corresponding to the source set in the communication return mode, from the DASH server 11, and transmits the acquired DASH segment to the proxy server 21-2 through the Internet 41.

Then, the proxy server 21-2 transmits the DASH segment (the DASH segment according to the segment request Req2/1) received through communication from the switching server 12, to the DASH client 22-3. In addition, the proxy server 21-2 transmits the DASH segment (the DASH segment according to the segment request Req2/2) received through broadcast from the switching server 12, to each of the DASH clients 22-4-1 to 22-4-i, and 22-6-1 to 22-6-j.

As described above, in the third period (the time t2 to the time t3), in the segment requests Req1/1 and Req2/2, the request with respect to a specific segment URL increases, and the traffic of the streaming service is concentrated, and thus, the response with respect to the segment requests Req1/1 and Req2/2 is returned through broadcast, by using the broadcast off-loading service.

In addition, in the segment requests Req2/1 and Req1/2, the traffic of the streaming service is not concentrated, and thus, the response with respect to the segment requests (Req2/1 and Req1/2) is returned through communication, through the Internet 41, as with the first period of FIG. 14.

(Traffic of Fourth Period)

Finally, the request/response traffic in a fourth period (after a time t3), will be described with reference to FIG. 17.

In the fourth period, the segment request to be processed by the switching server 12, is RequestForSegURL-1-40 and the subsequence and RequestForSegURL-2-40 and the subsequence.

Figure 17:
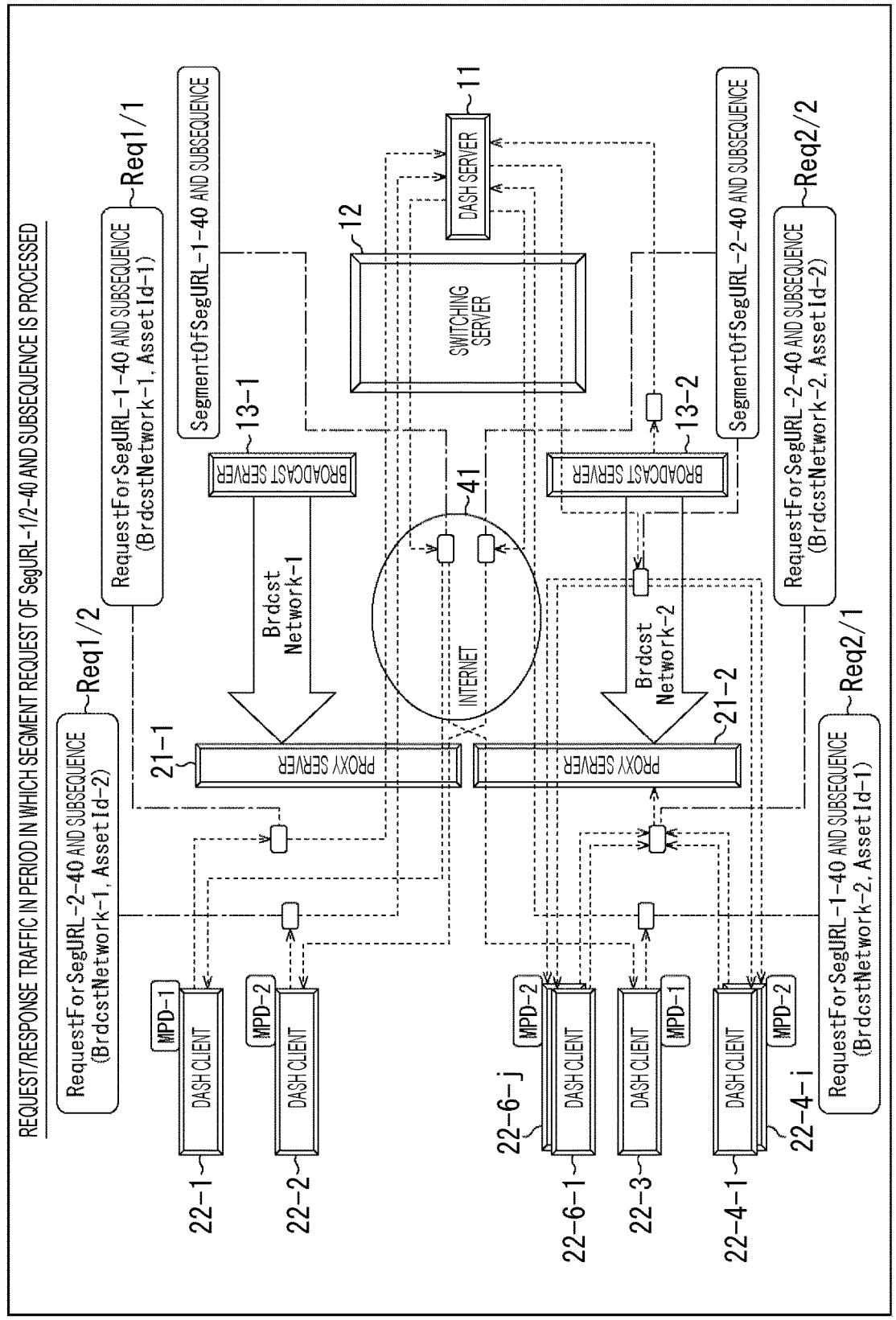
FIG. 17 is a diagram illustrating a request/response traffic (a fourth period) of the segment.

In the fourth period of FIG. 17, the DASH client 22 issuing the segment request based on MPD-1 in the DASH clients 22 connected to the proxy server 21-1, decreases to the DASH client 22-1 from the DASH clients 22-1-1 to 22-1-n, and 22-5-1 to 22-5-m, compared to the third period of FIG. 16.

However, there is no increase and decrease in the DASH client 22 issuing the segment request based on MPD-2 in the DASH clients 22 connected to the proxy server 21-1, and the DASH client 22 issuing the segment request based on MPD-1 and MPD-2 in the DASH clients 22 connected to the proxy server 21-2.

In addition, in the fourth period, for example, in MPD-1, a certain Period element is ended, and the return of the DASH segment with respect to the segment request Req1/1 in the broadcast return mode, is ended.

In such a configuration, the segment requests Req1/1, Req2/1, and Req1/2 are received by the switching server 12 through the Internet 41. The switching server 12 determines the return mode of the response (the DASH segment), according to a predetermined condition, on the basis of the network identification information and the source identification information, obtained from the segment requests Req1/1, Req2/1, and Req1/2.

Here, in the segment requests Req1/1, Req2/1, and Req1/2, the request with respect to a specific segment URL does not increase, and thus, the switching server 12 determines that it is not necessary to use the broadcast off-loading service in the response (the DASH segment) with respect to the segment requests Req1/1, Req2/1, and Req1/2. That is, the response (the DASH segment) with respect to the segment requests Req2/1 and Req1/2, is returned in the communication return mode.

Furthermore, in the fourth period of FIG. 17, the broadcast return mode is continued with respect to the segment request Req2/2, as with the third period of FIG. 16.

The switching server 12 acquires the DASH segment according to the segment requests Req1/1 and Req1/2, which is the DASH segment corresponding to the source set in the communication return mode, from the DASH server 11, and transmits the acquired DASH segment to the proxy server 21-1 through the Internet 41.

Then, the proxy server 21-1 transmits the DASH segment (the DASH segment according to the segment request Req1/1) received through communication from the switching server 12, to the DASH client 22-1. In addition, the proxy server 21-1 transmits the DASH segment (the DASH segment according to the segment request Req1/2) received through communication from the switching server 12, to the DASH client 22-2.

On the other hand, the DASH segment according to the segment request Req2/2, which is the DASH segment corresponding to the source set in the broadcast return mode, is acquired from the DASH server 11, and is transmitted to the broadcast server 13-2. Then, the broadcast server 13-2 transmits the DASH segment to the proxy server 21-2 through the broadcast network BN-2 (BrdcstNetwork-2).

In addition, the switching server 12 acquires the DASH segment according to the segment request Req2/1, which is the DASH segment corresponding to the source set in the communication return mode, from the DASH server 11, and transmits the acquired DASH segment to the proxy server 21-2 through the Internet 41.

Then, the proxy server 21-2 transmits the DASH segment (the DASH segment according to the segment request Req2/1) received through communication from the switching server 12, to the DASH client 22-3. In addition, the proxy server 21-2 transmits the DASH segment (the DASH segment according to the segment request Req2/2) received through broadcast from the switching server 12, to each of the DASH clients 22-4-1 to 22-4-i, and 22-6-1 to 22-6-j.

As described above, in the fourth period (after the time t3), in the segment request Req2/2, the request with respect to a specific segment URL increases, and the traffic of the streaming service is concentrated, and thus, the response with respect to the segment request Req2/2 is returned through broadcast, by using the broadcast off-loading service.

In addition, in the segment requests Req1/1, Req2/1, and Req1/2, the traffic of the streaming service is not concentrated, and thus, the response with respect to the segment requests (Req1/1, Req2/1, and Req1/2), is returned through communication, through the Internet 41, as with the first period of FIG. 14.

4. Inserting Method of Identification Information

In a method of inserting the broadcast network identification information and the source identification information with respect to the segment request, by the proxy server 21, for example, a header of an HTTP request of the segment request is expanded, and thus, the identification information can be expanded.

(Example of Expansion Header)

FIG. 18 is a diagram illustrating an example of an expansion header of the present technology.

FIG. 18 illustrates a description example of the expansion header in a case of ATSC 3.0 service, as an example of the expansion of an HTTP request header.

In FIG. 18, an expansion header name to be expanded to a general-purpose header of the HTTP request header, for example, is "ATSC 3.0-request". Here, the general-purpose header indicates a header to be applied to connection, but not an entity body of the request or the response. Furthermore, in a case where the expansion header name is defined as a private header, the expansion header name can be "X-ATSC 3.0-request".

Main attribute associated with delivery of the ATSC 3.0 service, such as a service ID (service-id), a contents ID (contentId), the URL of the MPD metadata (mpd-uri), time information (broadcastTime), and a broadcast stream ID list (broadcastStreamIdList), can be included as the value of the expansion header.

The service ID is an ID (a global service ID) for identifying the service defined by ATSC 3.0. The service ID is the essential value.

Furthermore, the details of the service ID (globalServiceId) defined by ATSC 3.0, are disclosed in "Table 7.1 Semantics of the User Service Bundle Description Fragment for ROUTE/DASH" of Non-Patent Document 2 described below. That is, the value of globalServiceID attribute of a userServiceDescription element of the USBD metadata, can be used as the service ID.

Non-Patent Document 2: ATSC Candidate Standard: Signaling, Delivery, Synchronization, and Error Protection (A/331)

The URL of the MPD metadata is a uniform resource identifier (URI) representing an absolute path of the MPD metadata to be referred to by the USBD metadata. The URL is an optional value.

Furthermore, as disclosed in "Table 7.1 Semantics of the User Service Bundle Description Fragment for ROUTE/DASH" of Non-Patent Document 2 described above, the value of fullMPDUri attribute of the userServiceDescription element of the USBD metadata, can be used as the URL of the MPD metadata.

The time information represents a time when the contents are actually broadcast. However, the selection of the contents of a broadcast time, depends on implementation. That is, for example, whether the broadcast time is a start time of a delivery schedule of the contents, or an arbitrary time from the start to the end of the delivery schedule (a time when a packet of the HTTP request reaches), is set according to an operation. The time information is an optional value.

The contents ID is an ID for identifying the contents. For example, "EIDR" or "Ad-ID" can be designated as the contents ID.

Here, "EIDR" is the abbreviation of Entertainment Identifier Registry, and the contents of a television program or a video, can be managed by a global single ID. "Ad-ID" is the abbreviation of an Advertising ID, and is an ID for advertisement. The contents ID is an optional value.

The broadcast stream ID list is a list of the broadcast stream ID (BroadcastStreamID: bsid) for identifying the broadcast stream that is defined by ATSC 3.0.

Furthermore, the details of the broadcast stream ID (bsid) defined by ATSC 3.0, are disclosed in "Table 6.2 SLT XML Format" of Non-Patent Document 2 described above. That is, bsid attribute of an SLT element of the SLT metadata of the LLS, can be used as the broadcast stream ID.

Figure 19:
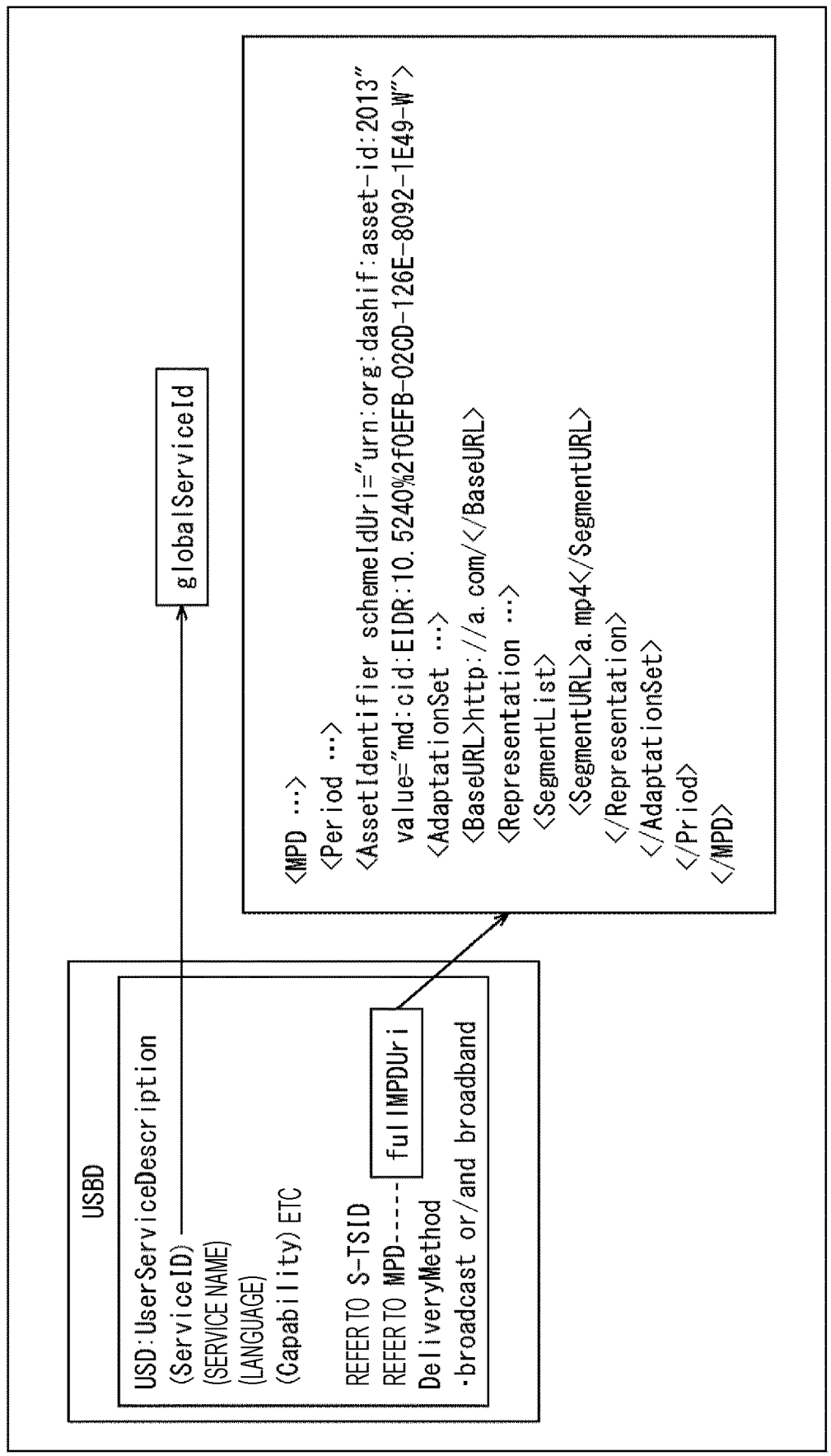
FIG. 19 is a diagram illustrating an example of identification information that is inserted as the expansion header.

Here, FIG. 19 illustrates an example of information to be inserted with respect to the HTTP request, as the expansion header.

That is, in FIG. 19, a description example of the USBD metadata and the MPD metadata in an XML format is illustrated, but information obtained from such metadata can be included in the expansion header of the HTTP request, as the attribute associated with the delivery of the ATSC 3.0 service.

For example, in the USBD metadata, the service ID (the global service ID) is obtained from the value of the globalServiceID attribute of the userServiceDescription element, and the URL of the MPD metadata is obtained from the value of the fullMPDUri attribute of the userServiceDescription element. In addition, for example, in the MPD metadata, the contents ID corresponding to EIDR is obtained from the value of the AssetIdentifier element of the Period element.

Furthermore, matching between a URL to be described in a DeliveryMethod element of the USBD metadata, and the URL (the segment URL) to be described in the Representation element of the MPD metadata, is performed, and thus, it is possible to specify whether a delivery path of the data (the stream) of the contents, is a path through broadcast or a path through communication.

Next, a specific example of the HTTP request header will be described with reference to FIG. 20 and FIG. 21. Here, first, the HTTP request header before expansion header insertion, will be described with reference to FIG. 20, and then, the HTTP request header after the expansion header insertion, will be described with reference to FIG. 21.

(HTTP Request)

Figure 20:
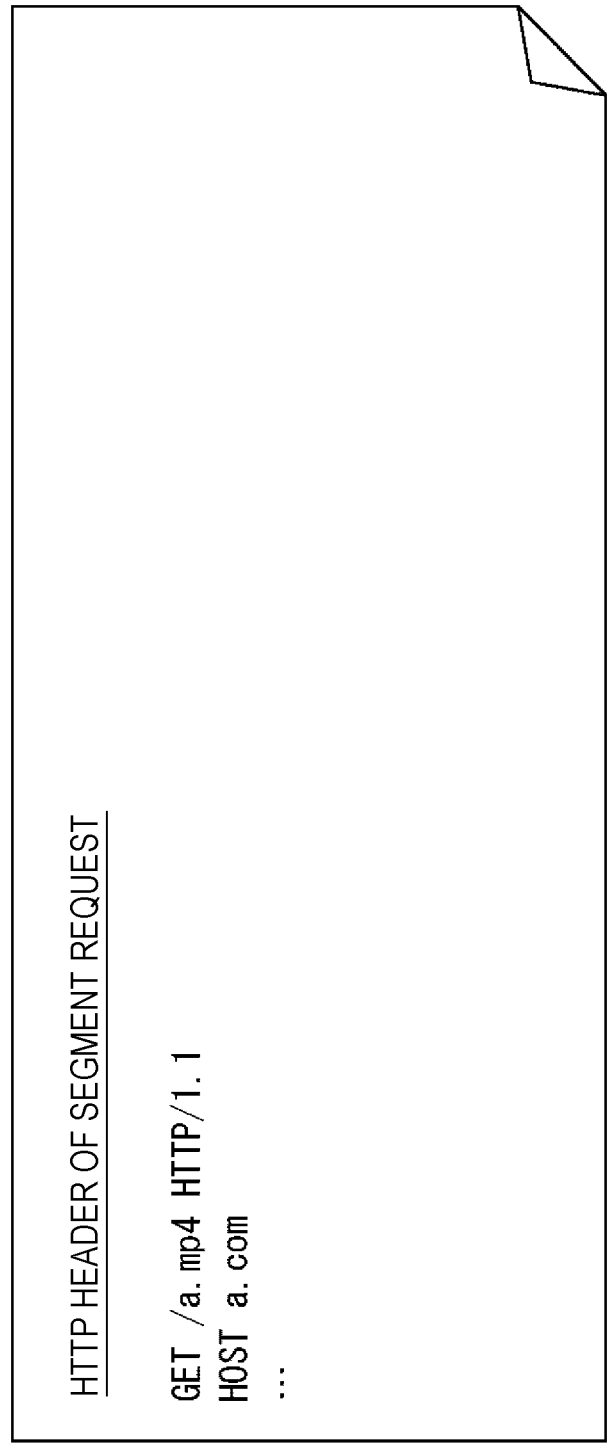
FIG. 20 is a diagram illustrating an example of an HTTP request.

FIG. 20 is a diagram illustrating an example of the HTTP request.

In FIG. 20, an example of the HTTP request for acquiring the DASH segment file, in a case where the segment URL is "http://a.com/a.mp4", is illustrated.

In methods defined by HTTP, a GET method is used in the HTTP request. In the HTTP request, a host name (a server name) is designated by HOST, and a resource is designated by the GET method. Furthermore, "HTTP/1.1" represents the version of HTTP.

Furthermore, in the HTTP request, the first row is an HTTP request row, and the second row and the subsequence are an HTTP header row, that is, the HTTP request header. In addition, in a case of using the GET method, no description is performed in an HTTP body portion.

(HTTP Request after Expansion Header Insertion)

FIG. 21 is a diagram illustrating an example of the HTTP request to which the expansion header is inserted.

In FIG. 21, the row of the expansion header name of "atsc3.0-request" is added to the HTTP request (the HTTP request header) of FIG. 20, as the expansion header.

That is, the service ID, the contents ID, the URL of the MPD metadata, the time information, and the broadcast stream ID (bsid) are added as the expansion header.

For example, in the expansion header of the HTTP request of FIG. 21, "urn:atsc:serviceId:NBCU-NFL-1" that is the value of the globalServiceID attribute of the USBD metadata, is designated as the service ID (service-id), and "http://a.com/a.mpd" that is the value of the fullMPDUri attribute of the USBD metadata, is designated as the URL of the MPD metadata (mpd-uri).

In addition, in the expansion header of the HTTP request of FIG. 21, "md:cid:EIDR:10.5240%2f0EFB-02CD-126E-8092-1E49-W" that is EIDR described in the AssetIdentifier element of the MPD metadata, is designated as the contents ID (contentId). That is, the contents ID corresponds to the source identification information that is inserted by the proxy server 21.

In addition, in the expansion header of the HTTP request of FIG. 21, "Fri, 4 Jul. 2016 23:54:58 GMT" representing Jul. 4, 2016 (Fri) 23:54:58 (Greenwich standard time) that is the broadcast time of the contents, is designated as the time information (broadcastTime).

Further, in the expansion header of the HTTP request of FIG. 21, "bsid-1" that is the value of the bsid attribute of the SLT element of the SLT metadata, is designated as the broadcast stream ID (bsid). That is, the broadcast stream ID corresponds to the broadcast network identification information that is inserted by the proxy server 21.

As described above, in the present technology, the proxy server 21 inserts the source identification information (the contents ID) and the broadcast network identification information (the broadcast stream ID) with respect to the HTTP request, as the expansion header, and thus, in the switching server 12, it is possible to dynamically switch the return through broadcast (through the broadcast network) and the return through communication (through the bidirectional network), as the return path of the response with respect to the HTTP request, on the basis of the identification information described above.

Furthermore, in the proxy server 21, the broadcast stream ID (bsid) that is inserted as the broadcast network identification information, is obtained from the SLT metadata of the LLS flowing through the broadcast stream (BroadcastStream) that can be subjected to channel selection by the tuner 201 of the proxy server 21 itself.

In addition, in the proxy server 21, when the broadcast stream ID (bsid) is inserted, the contents of the SLT metadata or the ESG information, acquired in advance (the well-known information), is confirmed, and whether or not it is the broadcast stream ID (bsid) with which the broadcast off-loading service is capable of being used in a target time zone, is confirmed, and then, the broadcast stream ID (bsid) is inserted with respect to the HTTP request. The details of the well-known information included in the SLT metadata or the ESG information, will be described later.

Further, in the proxy server 21, a mapping data base storing information such as the broadcast network identification information or the source identification information, is generated in advance before expansion header insertion processing, and thus, in the expansion header insertion processing, it is possible to acquire information to be inserted with respect to the HTTP request, with reference to the mapping data base.

Furthermore, here, ATSC (in particular, ATSC 3.0) that is a system adopted in the United States of America or the like, has been exemplarily described as a standard of digital broadcast, but the present technology may be applied to integrated services digital broadcasting (ISDB) that is a system adopted in Japan or the like, digital video broadcasting (DVB) that is a system adopted in each country of Europe or the like, and the like.

However, in the above description, the service ID, the contents ID, the broadcast stream ID (bsid), and the like have been exemplified as the information to be inserted with respect to the HTTP request, on the premise of the ATSC 3.0 service, but the present technology is not limited thereto, and more suitable information can be used for each standard such as ISDB or DVB.

In addition, information defined by a standard other than the standard of the digital broadcast, can be added as the information to be inserted with respect to the HTTP request, as necessary. For example, information defined by a third generation partnership project (3GPP) that is a standardization project of mobile communication system, can be added. Specifically, an element or attribute defined by 3GPP-multimedia broadcast multicast services (MBMS), can be added as the information to be inserted with respect to the HTTP request.

5. Well-Known Method of Broadcast Off-Loading Service

Next, a delivery method of the well-known information for informing that the broadcast off-loading service is capable of being used, will be described. Here, for example, the SLT metadata (the LLS) is expanded, or the ESG information is expanded, and thus, the well-known information is delivered.

(Delivery of Well-Known Information According to Expansion of LLS)

In the SLT metadata that is one of the LLSs, serviceCategory attribute indicating the type of service is defined (refer to Non-Patent Document 2 described above).

FIG. 22 illustrates an example of the value of the serviceCategory attribute that is provided in a service loop of the SLT metadata.

As illustrated in FIG. 22, for example, it is possible to designate the type of service of whether the service is general broadcast service (1: linear A/V service) or audio only service (2: linear audio only service), according to the serviceCategory attribute. Furthermore, the audio only service corresponds to the existing radio broadcast.

As defined in "Table 6.4 Code Values for SLT.Service@serviceCategory" of Non-Patent Document 2 described above, values of 0 to 5 and Other values are defined in the serviceCategory attribute.

"6" is newly defined as the value of the serviceCategory attribute, and indicates the broadcast off-loading service. That is, here, it is possible to include the well-known information indicating that the broadcast off-loading service is delivered, in the SLT metadata, according to the addition and expansion of the attribute value, but not the addition of the element or the attribute.

FIG. 23 illustrates a description example of the SLT metadata. For example, in a case where the broadcast off-loading service is capable of being used from 13 o'clock to 15 o'clock on Sep. 12, 2016, serviceCategory="6" is designated to one of Service elements of the SLT metadata in such a time zone, as the value of the serviceCategory attribute. That is, the SLT metadata is delivered from 13 o'clock to 15 o'clock on Sep. 12, 2016.

(Delivery of Well-Known Information According to Expansion of ESG)

The ESG service is the electronic service guide (electronic program information) defined by an open mobile alliance (OMA) that is an organization performing standard formulation of a mobile phone, and it is also assumed that program information (ESG) based on OMA-ESG, is used in ATSC 3.0 (refer to Non-Patent Document 3 described below).

Non-Patent Document 3: ATSC Candidate Standard: Service Announcement (A/332)

As illustrated in FIG. 24, in the program information (ESG) of ATSC 3.0, there is an element of ServiceType indicating the type of service of whether the service is general broadcast service (linear service), radio broadcast (the linear audio only service), or App-based service (App-based enhancement service).

Furthermore, the general broadcast service of the ESG corresponds to the general broadcast service (1: the linear A/V service) defined by the SLT metadata, and the radio broadcast of the ESG corresponds to the audio only service (2: the linear audio only service) de fined by the SLT metadata, compared to the ServiceType element of the ESG and the serviceCategory attribute of the SLT metadata. Further, the App-based service of the ESG corresponds to App-based service (3: App-based service) defined by the SLT metadata.

That is, a value defined to "5.2.2.1.1 Service Type" of Non-Patent Document 3 described above, is defined as the ServiceType element of the ESG.

As illustrated in FIG. 24, "230" is newly defined as the value of the ServiceType element, and indicates the broadcast off-loading service. That is, here, it is possible to include the well-known information indicating that the broadcast off-loading service is delivered, in the ESG information, according to the addition and expansion of a value that is stored as the contents of the element, but not the addition of the element or the attribute.

FIG. 25 illustrates a description example of the ESG information. As illustrated in FIG. 25, ServiceType="230" is designated to a service fragment of the ESG information, as the value of the ServiceType element, and represents that target service is the broadcast off-loading service.

In addition, for example, in a case where the broadcast off-loading service is capable of being used in a time zone like from 13 o'clock to 15 o'clock on Sep. 12, 2016, in the ESG information, an effective period of the broadcast off-loading service can be given in notification in advance, by using an XML fragment such as a contents fragment or a schedule fragment, in addition to the service fragment illustrated in FIG. 25. Such a specific example is illustrated in FIG. 26 and FIG. 27.

(Relationship of XML Fragment)

FIG. 26 is a diagram illustrating a relationship of the XML fragments of the service, the contents, and the schedule in a case where the broadcast off-loading service is capable of being used in a certain time zone.

The service fragment is identified by an ID of "//a.com/Service-1", and ServiceType="230" is designated as the value of the ServiceType element. That is, the service (Service-1) is the broadcast off-loading service.

The contents fragment is identified by an ID of "//a.com/Content-1-1", and "Broadcast off-loading Service" is designated as a Name element. That is, the name of the contents is the broadcast off-loading service.

Furthermore, in FIG. 26, the contents fragment is associated with the service fragment, according to the value of idRef attribute of a ServiceReference element.

The schedule fragment is identified by an ID of "//a.com/Schedule-1-1", "2016-09-12T13:00:00+00:00" is designated as a startTime attribute of a PresentationWindow element that is a child element of a ContentReference element, and "2016-09-12T15:00:00+00:00" is designated as an endTime attribute.

That is, a start time t1 and an end time t2 of the broadcast off-loading service are designated according to the startTime attribute and the endTime attribute. In such a case, the broadcast off-loading service is delivered from 13 o'clock to 15 o'clock on Sep. 12, 2016.

Furthermore, in FIG. 26, the schedule fragment is associated with the service fragment, according to the value of the idRef attribute of the ServiceReference element. In addition, the schedule fragment is associated with the contents fragment, according to the value of the idRef attribute of the ContentReference element.

(Screen Example of ESG Service)

FIG. 27 is a diagram illustrating a display example of a screen of the ESG service in a case where the broadcast off-loading service is not capable of being used.

The screen of the ESG service of FIG. 27 is a display example of the screen to be displayed on a client device 20 receiving the ESG information including the XML fragment illustrated in FIG. 26.

That is, in the screen of the ESG service, the broadcast off-loading service is displayed as Service-1, within a frame of a time zone from the start time t1 (at 13 o'clock on Sep. 12, 2016) to the end time t2 (at 15 o'clock on Sep. 12, 2016). With this arrangement, it is possible to notify (inform) in advance the end user that the broadcast off-loading service is delivered in the time zone.

However, whether or not to display the delivery of the broadcast off-loading service on the screen of the ESG service, depends on the implementation of a user interface (UI) of the client device 20.

Furthermore, the well-known information may be delivered by at least one delivery method of the delivery methods of the well-known information according to the expansion of the LLS and the expansion of the ESG, described above. In addition, the well-known information may be delivered by a delivery method other than the delivery method of the well-known information according to the expansion of the LLS and the expansion of the ESG.

6. Contents Transmitting and Receiving Processing (Flow of Contents Transmitting and Receiving Processing)

Next, the details of the contents transmitting and receiving processing that is performed by each of the devices on the transmitting side and the receiving side, will be described with reference to flowcharts of FIG. 28 to FIG. 31.

Figure 28:
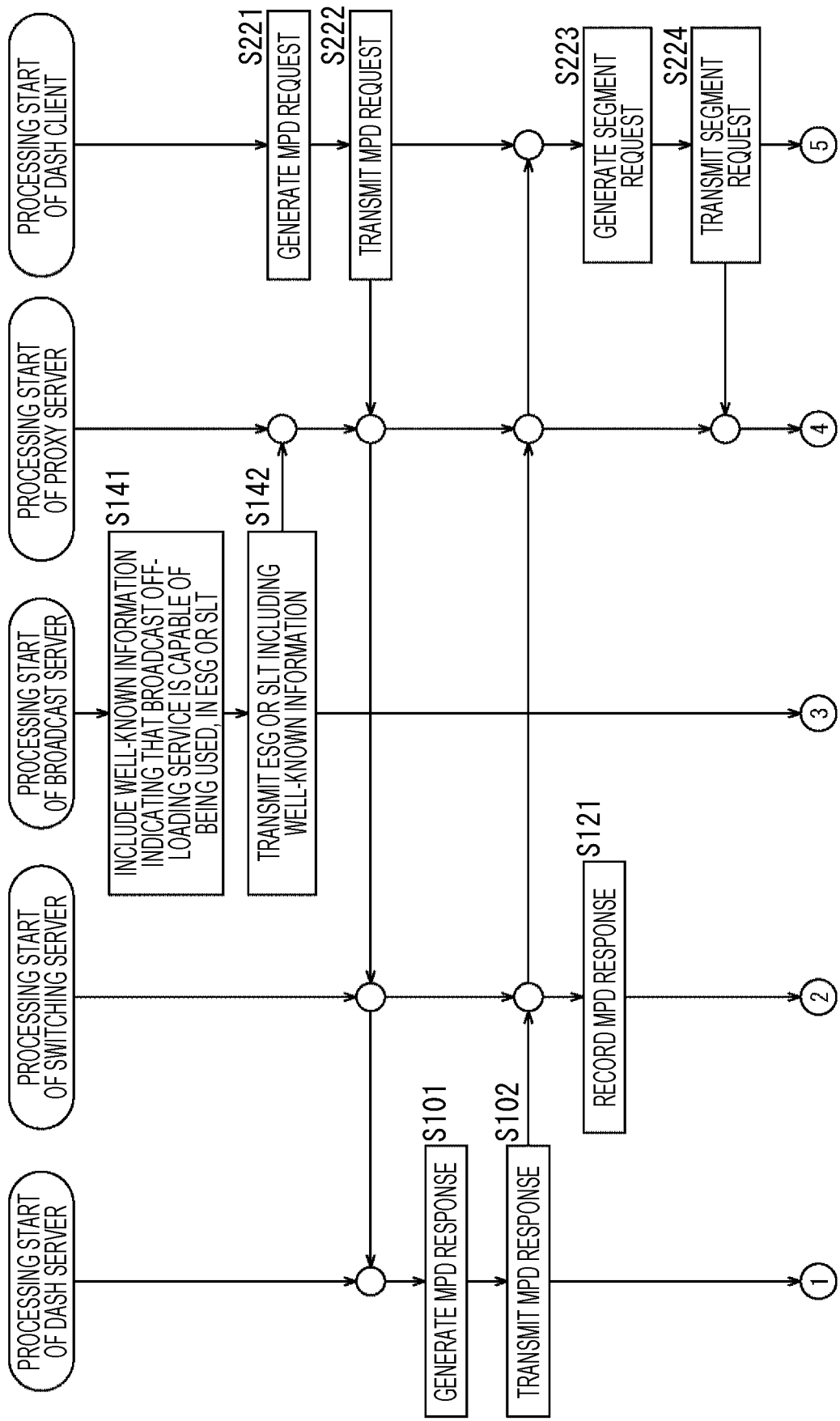
FIG. 28 is a flowchart illustrating a flow of contents transmitting and receiving processing.
Figure 29:
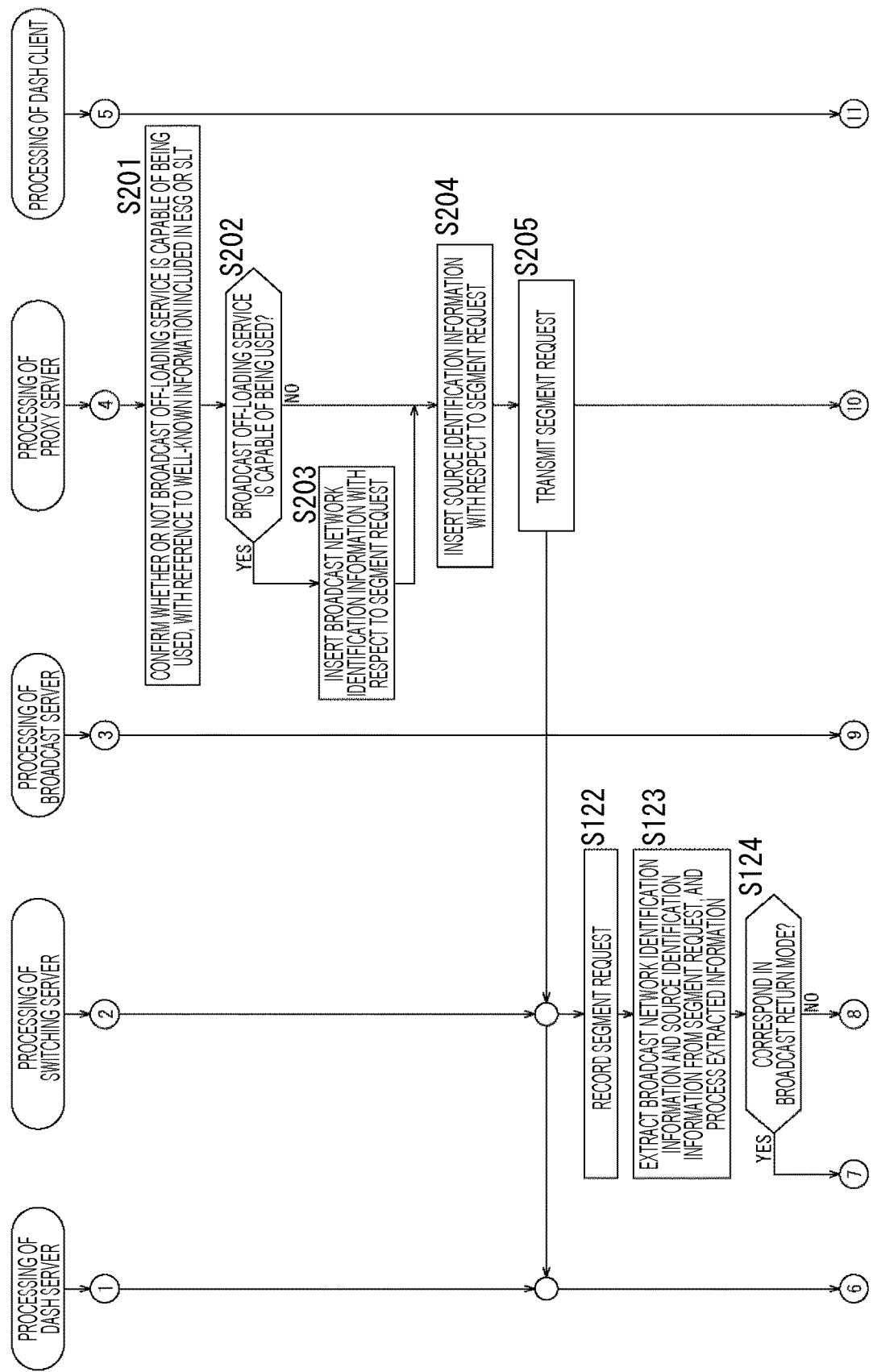
FIG. 29 is a flowchart illustrating the flow of the contents transmitting and receiving processing.
Figure 30:
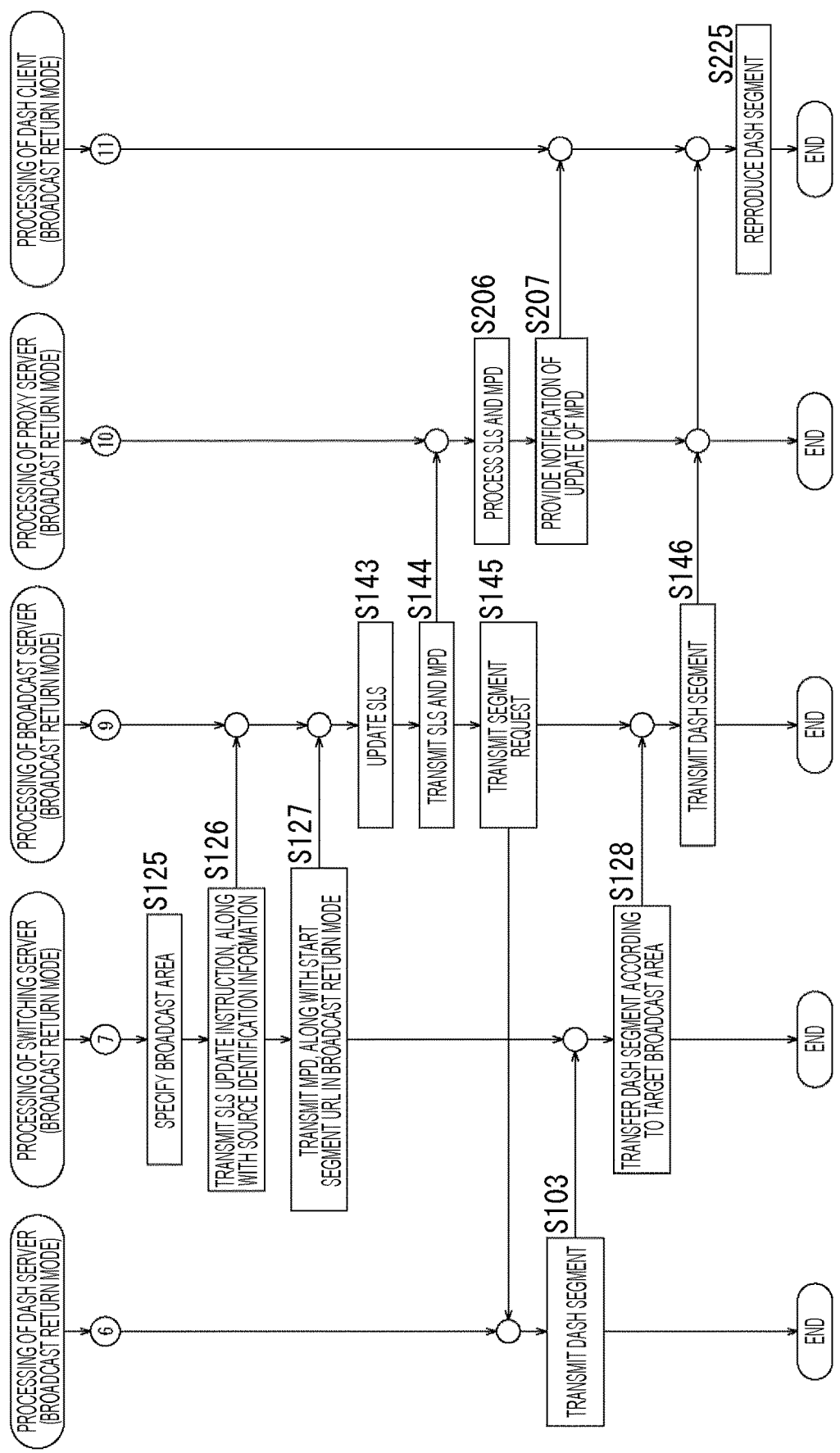
FIG. 30 is a flowchart illustrating the flow of the contents transmitting and receiving processing.

Furthermore, in FIG. 28 to FIG. 30, the processings of steps S101 to S103, S121 to S128, and S141 to S146, are respectively executed by the DASH server 11, the switching server 12, and the broadcast server 13, on the transmitting side. On the other hand, the processings of steps S201 to S207, and 221 to S225 are respectively executed by the proxy server 21 and the DASH client 22, on the receiving side.

In step S141 of FIG. 28, the ESG and metadata processor 151 generates the well-known information indicating that the broadcast off-loading service is capable of being used, and includes the well-known information in the ESG information or the SLT metadata.

In step S142, the transmitting unit 142 transmits the ESG information or the SLT metadata including the well-known information obtained by the processing of step S141. The ESG information or the SLT metadata is received by the proxy server 21 provided in a target broadcast area, through the broadcast network, and it is possible to inform that the broadcast off-loading service is capable of being used, according to the well-known information included in the ESG information or the SLT metadata.

In step S221, the request processor 231 generates the MPD request of desired contents. Here, the desired contents, for example, are selected according to the manipulation of the end user.

In step S222, the communication I/F 221 transmits the MPD request obtained by the processing of step S221, to the proxy server 21. In the proxy server 21, the MPD request from the DASH client 22 is received, and is transmitted to the switching server 12 by the communication I/F 202, through the Internet 41.

Furthermore, here, the proxy server 21 or the DASH client 22, for example, acquires the URL of the MPD metadata by some methods such as access with respect to a Web page of a streaming site that is published on the Internet 41, and the MPD request is transmitted to the DASH server 11.

Thus, the MPD request from the DASH client 22 is finally received by the DASH server 11 through the Internet 41 or the like.

In step S101, the MPD processor 111 generates the MPD response (the MPD metadata) on the basis of the MPD request.

In step S102, the communication I/F 101 transmits the MPD response (the MPD metadata) obtained by the processing of step S101, to the switching server 12. In the switching server 12, the MPD response from the DASH server 11 is received, and is transmitted to the DASH client 22 through the proxy server 21, by the communication I/F 124 through the Internet 41.

Furthermore, in the switching server 12, the MPD response from the DASH server 11 is transferred, and at this time, the MPD metadata included in the MPD response, is recorded in the storage unit 122 (S121). In addition, the MPD response from the DASH server 11 is finally received by the DASH client 22 through the Internet 41 or the like.

In step S223, the request processor 231 generates the segment request of the desired contents on the basis of the result of parsing the MPD metadata included in the MPD response.

In step S224, the communication I/F 221 transmits the segment request obtained by the processing of step S223, to the proxy server 21. In the proxy server 21, the segment request from the DASH client 22 is received.

In step S201 of FIG. 29, the ESG and metadata processor 211 processes the ESG information or the SLT metadata, received from the broadcast server 13, and confirms whether or not the broadcast off-loading service is capable of being used, with reference to the well-known information included in the ESG information or the SLT metadata.

In step S202, the ESG and metadata processor 211 determines whether or not the broadcast off-loading service is capable of being used, on the basis of a confirmation result of step S201.

In step S202, in a case where it is determined that the broadcast off-loading service is capable of being used, the processing proceeds to step S203. In step S203, the request processor 212 inserts the broadcast network identification information (the broadcast stream ID) with respect to the segment request (the header of the HTTP request) from the DASH client 22.

Then, in a case where the processing of step S203 is ended, the processing proceeds to step S204. In step S204, the request processor 212 further inserts the source identification information (the contents ID) with respect to the segment request (the header of the HTTP request) including the broadcast network identification information.

On the other hand, in step S202, in a case where it is determined that the broadcast off-loading service is capable of being used, the processing of step S203 is skipped, and the processing proceeds to step S204. In step S204, the request processor 212 inserts the source identification information (the contents ID) with respect to the segment request (the header of the HTTP request) from the DASH client 22.

Thus, in a case where the broadcast off-loading service is capable of being used, the broadcast network identification information and the source identification information are inserted with respect to the segment request, whereas in a case where the broadcast off-loading service is not capable of being used, only the source identification information is inserted with respect to the segment request.

In step S205, the communication I/F 202 transmits the segment request obtained by the processings of step S201 to S204, to the switching server 12 through the Internet 41. The segment request is transferred to the DASH server 11 by the switching server 12.

In step S122, the request processor 131 records the segment request from the proxy server 21, in the storage unit 122.

In step S123, the request processor 131 extracts the broadcast network identification information (the broadcast stream ID) and the source identification information (the contents ID) from the segment request (the header of the HTTP request) from the proxy server 21, and processes the extracted information.

Here, in a case where the proxy server 21 that is a transmitting source of a segment request to be processed, is capable of using the broadcast off-loading service, the broadcast network identification information and the source identification information are included in the segment request. On the other hand, in a case where the proxy server 21 that is the transmitting source of the segment request to be processed, is not capable of using the broadcast off-loading service, only the source identification information is included in the segment request.

Then, for example, the request processor 131 counts the number of requests of the segment request for each contents (source) to be identified by the source identification information, by providing a specified measurement period, and in a case where a count value is greater than or equal to a threshold value set in advance, a response with respect to the segment request including the subsequent corresponding source identification information, is returned in the broadcast return mode.

In step S124, the request processor 131 determines whether or not to correspond to the response with respect to the segment request, in the broadcast return mode, on the basis of a processing result of the segment request.

In step S124, in a case where it is determined to correspond in the broadcast return mode, the processing proceeds to step S125 of FIG. 30. FIG. 30 illustrates processing contents in the broadcast return mode, as processing after the determining processing of step S124 of FIG. 29.

Figure 31:
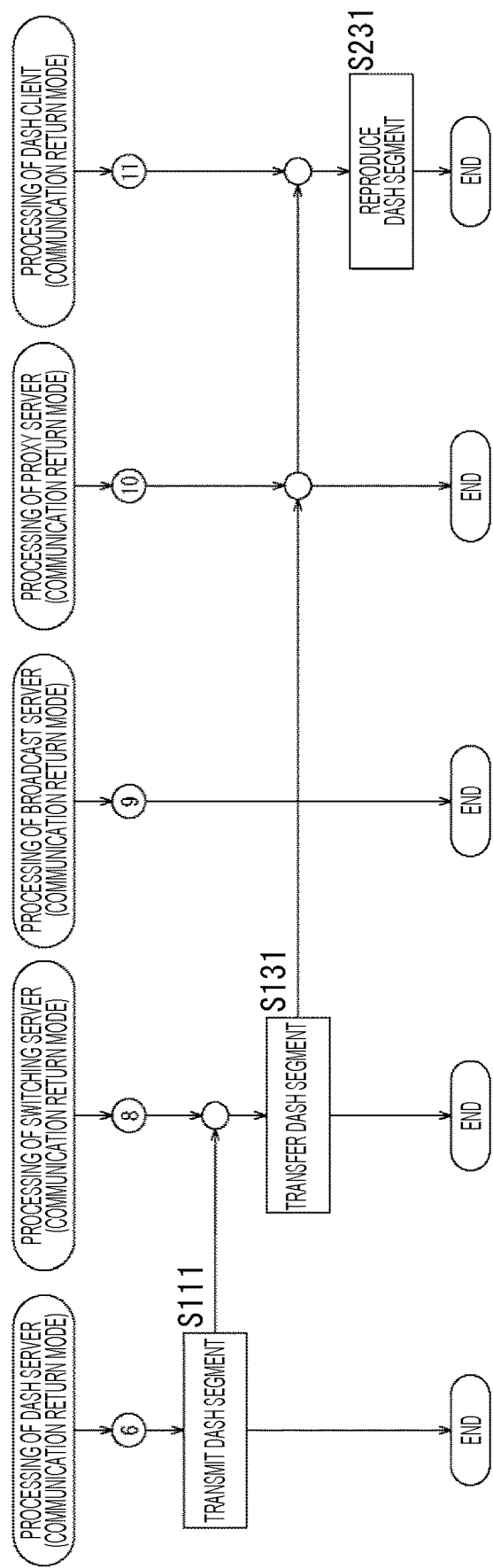
FIG. 31 is a flowchart illustrating the flow of the contents transmitting and receiving processing.

Furthermore, the details will be described later, but in step S124, in a case where it is determined to correspond in the communication return mode, the processing proceeds to step S131 of FIG. 31. FIG. 31 illustrates processing contents in the communication return mode, as processing after the determining processing of step S124.

Returning to the description of FIG. 30, in step S125, the broadcast processor 132 specifies the target broadcast area at the time of returning the response with respect to the segment request to be processed, in the broadcast return mode.

In step S126, the broadcast processor 132 transmits an SLS update instruction to the broadcast server 13 performing broadcast in the target broadcast area that is specified by the processing of step S125, along with the source identification information.

In step S127, the broadcast processor 132 transmits the MPD metadata stored by the processing of step S121, to the broadcast server 13 performing broadcast in the target broadcast area that is specified by the processing of step S125, along with a start segment URL in the broadcast return mode.

In the broadcast server 13, the source identification information and the SLS update instruction, and the start segment URL in the broadcast return mode and the MPD metadata, from the switching server 12, are received.

In step S143, the ESG and metadata processor 151 updates the SLS (the USBD metadata), and the DASH segment of the contents (the source) to be identified by the source identification information, includes information indicating the return in the broadcast return mode.

Furthermore, here, as described above, the method of updating the MPD metadata from the switching server 12 regardless of the flag according to the USBD metadata, and for example, of explicitly describing the return through broadcast or the return through communication, within the MPD metadata, may be used.

In step S144, the transmitting unit 142 transmits the SLS (the USBD metadata) and the MPD metadata after being updated, obtained by the processing of step S143. However, in the processing of step S143, in a case where the MPD metadata is not updated, the MPD metadata that is not updated, is not transmitted, and only the SLS may be transmitted.

The SLS and the MPD metadata after being updated, are received by the proxy server 21 provided in the target broadcast area, through the broadcast network. In step S206, the ESG and metadata processor 211 processes the SLS (the USBD metadata) and the MPD metadata after being updated.

The SLS (the USBD metadata) and the MPD metadata after being updated, include information indicating that the DASH segment of the contents (the source) to be identified by the source identification information, is returned in the broadcast return mode, and thus, the information is recognized in the proxy server 21.

In addition, in a case where the MPD metadata is updated on the basis of a processing result of step S206, the ESG and metadata processor 211 transmits (provides notification of) the MPD metadata after being updated, to the DASH client 22 through the communication I/F 203.

On the other hand, in the broadcast server 13, the DASH segment processor 152 transmits the segment request to the DASH server 11, on the basis of the start segment URL in the broadcast return mode. The segment request is received by the DASH server 11. Furthermore, here, the segment request may be exchanged through the switching server 12.

In step S103, the DASH segment processor 112 acquires the DASH segment of the target contents (source) on the basis of the segment request from the broadcast server 13, and transmits the acquired DASH segment to the switching server 12. The DASH segment is received by the switching server 12.

In step S128, the broadcast processor 132 transfers DASH segment from the DASH server 11, to the broadcast server 13 performing broadcast in the target broadcast area that is specified by the processing of step S125. The DASH segment is received and processed by the broadcast server 13.

In step S146, the transmitting unit 142 transmits the DASH segment. The DASH segment is received by the proxy server 21 provided in the target broadcast area, through the broadcast network, and is transferred to the DASH client 22 through the communication I/F 203.

In step S225, the reproducing unit 232 reproduces the DASH segment to be transferred from the proxy server 21. With this arrangement, in the DASH client 22, the DASH segment according to the segment request, is processed, and the desired contents are reproduced.

As described above, the flow of processing subsequent to a case where it is determined to correspond in the broadcast return mode, in the determining processing of step S124 of FIG. 29 ("YES" of S124), has been described with reference to FIG. 30. Next, the flow of the processing subsequent to a case where it is determined to correspond in the communication return mode, in the determining processing of step S124 of FIG. 29 ("NO" of S124), will be described with reference to FIG. 31.

Furthermore, in FIG. 31, the processings of step S111 and S131 are respectively executed by the DASH server 11 and the switching server 12, on the transmitting side. On the other hand, the processing of step S231 is executed by the DASH client 22 on the receiving side.

In step S111, the DASH segment processor 112 acquires the DASH segment of the target contents (source), on the basis of the segment request from the DASH client 22 or the switching server 12, and transmits the acquired DASH segment to the switching server 12. The DASH segment is received by the switching server 12.

In step S131, the communication processor 133 transmits (transfers) the DASH segment from the DASH server 11, to the proxy server 21 through the Internet 41. The DASH segment is received by the proxy server 21 through the Internet 41, and is transferred to the DASH client 22 through the communication I/F 203.

In step S231, the reproducing unit 232 reproduces the DASH segment to be transferred from the proxy server 21. With this arrangement, in the DASH client 22, the DASH segment according to the segment request, is processed, and the desired contents are reproduced.

As described above, the flow of processing subsequent to a case where it is determined to correspond in the communication return mode, in the determining processing of step S124 of FIG. 29 ("NO" of S124), has been described with reference to FIG. 31.

7. Modification Example (Application with respect to Other Broadcast Standards)
In the above description, ATSC (in particular, ATSC 3.0) that is a system adopted in the United States of America or the like, has been described as the standard of the digital broadcast, but the present technology may be applied to integrated services digital broadcasting (ISDB) that is a system adopted in Japan or the like, digital video broadcasting (DVB) that is a system adopted in each country of Europe or the like, and the like.

In addition, in the above description, ATSC 3.0 adopted to the IP transmission system has been described as an example, but ATSC 3.0 may be applied not only to the IP transmission system, but also for example, other systems such as an MPEG2-transport stream (TS) system.

Further, the standard of the digital broadcast can be applied not only to the standard of the terrestrial broadcast, but also to the standard of satellite broadcast using broadcasting satellite (BS), communications satellite (CS), or the like, cable broadcast such as a cable television (common antenna television: CATV), and the like.

Other Modification Example

The names such as the control information (the signaling) described above, are an example, and other names may be used. However, a difference in the names is a formal difference, and substantial contents of the target control information are not different.

For example, there is a case where the user service bundle description (USBD) is referred to as user service description (USD). In addition, for example, there is a case where the non real time (NRT) is referred to as a locally cached content (LCC), and the electronic service guide (ESG) is referred to as an electronic program guide (EPG).

In addition, in the DASH client 22 described above, a DASH player for reproducing the DASH segment, for example, can be not only an application developed with a markup language such as hypertext markup language 5 (HTML5) or a script language such as JavaScript (registered trademark), but also for example, an application developed with a programming language such as Java (registered trademark).

Further, such an application is not limited to an application to be executed by a browser, but may be executed in an operating system (OS) environment, or the like, as a so-called native application.

Furthermore, the application not only explicitly displays some information items, but also is operated in non-display (in the background) (operated without being recognized by the end user). In addition, the contents are capable of including not only a moving image or a music, but also for example, any contents such as an electronic book, a game, and an advertisement.

8. Configuration of Computer

Figure 32:
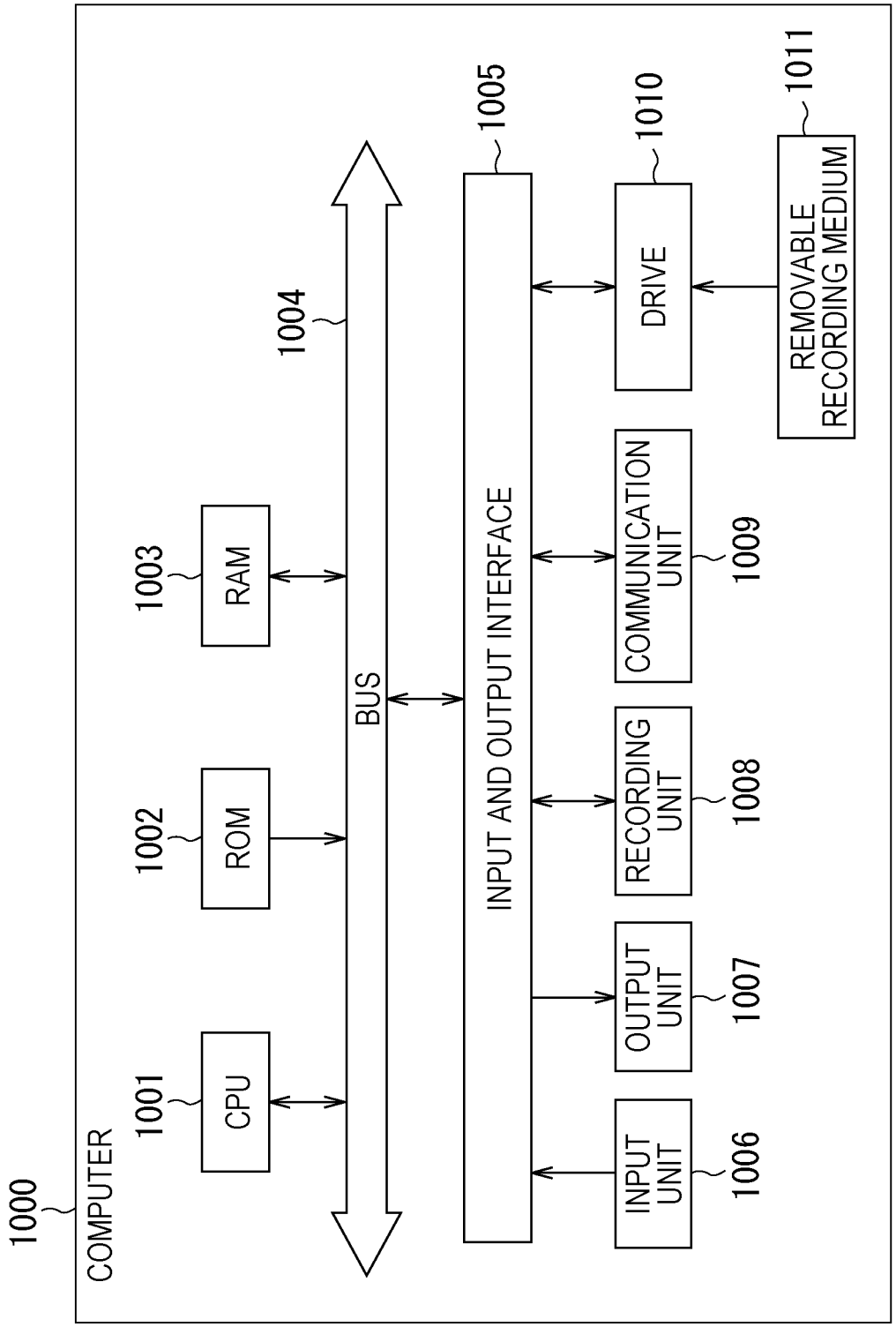
FIG. 32 is a diagram illustrating a configuration example of a computer.

A set of processings described above, can be executed by hardware, or can be executed by software. In a case where the set of processings is executed by software, a program configuring the software is installed in a computer. FIG. 32 is a diagram illustrating a configuration example of hardware of a computer executing the set of processings described above, with a program.

In a computer 1000, a central processing unit (CPU) 1001, a read only memory (ROM) 1002, and a random access memory (RAM) 1003 are connected to each other through a bus 1004. An input and output interface 1005 is further connected to the bus 1004. An input unit 1006, an output unit 1007, a recording unit 1008, a communication unit 1009, and a drive 1010 are connected to the input and output interface 1005.

The input unit 1006 includes a keyboard, a mouse, a microphone, or the like. The output unit 1007 includes a display, a speaker, or the like. The recording unit 1008 includes a hard disk, a non-volatile memory, or the like. The communication unit 1009 includes a network interface or the like. The drive 1010 drives a removable recording medium 1011 such as a magnetic disk, an optical disk, a magnetooptical disk, or a semiconductor memory.

In the computer 1000 configured as described above, the CPU 1001 loads a program recorded in the ROM 1002 or the recording unit 1008, on the RAM 1003 through the input and output interface 1005 and the bus 1004, and executes the program, and thus, the set of processings described above is performed.

The program executed by the computer 1000 (the CPU 1001), for example, can be provided by being recorded in the removable recording medium 1011 as package media or the like. In addition, the program can be provided through a wired or wireless transmission medium such as a local area network, the Internet, and digital satellite broadcast.

In the computer 1000, the program can be installed in the recording unit 1008 through the input and output interface 1005 by mounting the removable recording medium 1011 on the drive 1010. In addition, the program can be installed in the recording unit 1008 by being received by the communication unit 1009 through the wired or wireless transmission medium. In addition, the program can be installed in advance in the ROM 1002 or the recording unit 1008.

Here, herein, it is not necessary that the processings to be performed by the computer according to the program, are performed in chronological order according to the order described as the flowchart. That is, the processings to be performed by the computer according to the program, also include processings to be executed in parallel or individually (for example, parallel processings or processings according to an object). In addition, the program may be processed by one computer (processor), or may be subjected to distributed processing by a plurality of computers.

Furthermore, the embodiments of the present technology are not limited to the embodiments described above, and can be variously changed within a range not departing from the gist of the present technology.

In addition, the present technology is capable of having the following configurations.

(1) An information processing device, including:
a processor configured to process a request of contents, to be transmitted from a plurality of receiving devices, and to return a response with respect to the request,
in which the request includes first identification information for identifying a broadcast area capable of being received by the receiving device, and second identification information for identifying the contents, and
the processor dynamically switches return through communication and return through broadcast, as a return path of the response, on the basis of the first identification information and the second identification information.

(2) The information processing device according to (1),
in which the processor
selects a path through communication as the return path of the response, in normal times, and
selects a path through broadcast as the return path of the response, in a case in which a load is applied to the path through communication.

(3) The information processing device according to (2),
in which the processor
counts the number of requests for the contents identified by the second identification information, within a specified period, and
allows a response with respect to the request including the corresponding second identification information, to be returned through broadcast based on the first identification information, in a case in which the count value is greater than or equal to a threshold value set in advance.

(4) The information processing device according to (2) or (3),
in which in a case in which the return path of the response is switched to the path through broadcast from the path through communication, the processor requests update of control information in order to notify the receiving device that the return through broadcast is performed with respect to a first server returning the response through broadcast.

(5) The information processing device according to (4), in which the processor transfers a segment of a contents stream to be delivered from a second server, to the first server within a broadcast area identified by the first identification information, as the response.

(6) The information processing device according to any one of (1) to (5), in which in a case in which the receiving device fails to receive the response to be returned through broadcast, the processor allows the same response as the response to be returned through broadcast, to be returned through communication.

(7) The information processing device according to any one of (1) to (6), in which the first identification information is information corresponding to a radio frequency (RF) channel, and the second identification information is a contents ID.

(8) The information processing device according to (5), in which the contents stream is delivered from the second server, as a live stream or a video on demand (VOD) stream.

(9) The information processing device according to any one of (1) to (8), in which a path through communication is a path including the Internet, and a path through broadcast is a transmission path according to terrestrial broadcast corresponding to an Internet protocol (IP) transmission system.

(10) An information processing method of an information processing device, the method including:

a step of allowing the information processing device to process a request of contents, to be transmitted from a plurality of receiving devices, and to dynamically switch return through communication and return through broadcast, as a return path of a response with respect to the request, on the basis of first identification information for identifying a broadcast area capable of being received by the receiving device, and second identification information for identifying the contents, the first identification information and the second identification information being included in the request.

(11) An information processing device, including:

a processor configured to process a request of contents, and to insert first identification information for identifying a broadcast area capable of being received by the processor, and second identification information for identifying the contents, in which the processor processes a response to be returned through communication or a response to be returned through broadcast, as a response with respect to the request to be transmitted from a transmitting device.

(12) The information processing device according to (11), in which the response is returned through communication, in normal times, and is returned through broadcast, in a case in which a load is applied to a path through communication.

(13) The information processing device according to (12), in which in a case in which a load is applied to the path through communication, on the basis of well-known information to be transmitted from a first server returning the response through broadcast, the processor recognizes whether or not service of returning the response in a path through broadcast, is capable of being used.

(14) The information processing device according to (13), in which in a case in which the service is capable of being used, the processor inserts the first identification information and the second identification information with respect to the request, and in a case in which the service is not capable of being used, the processor inserts only the second identification information with respect to the request.

(15) The information processing device according to (14), in which the well-known information is included in control information to be delivered along with the contents.

(16) The information processing device according to (14), in which the well-known information is included in program information to be delivered in advance to the contents.

(17) The information processing device according to any one of (11) to (16), in which the first identification information is information corresponding to an RF channel, the second identification information is a contents ID, and the processor inserts the first identification information and the second identification information, into an expansion portion of a hypertext transfer protocol (HTTP) header of the request.

(18) The information processing device according to any one of (11) to (17), in which a contents stream is delivered from a second server, as a live stream or a VOD stream.

(19) The information processing device according to any one of (11) to (18), in which a path through communication is a path including the Internet, and a path through broadcast is a transmission path according to terrestrial broadcast corresponding to an IP transmission system.

(20) An information processing method of an information processing device, the method including:

a step of allowing the information processing device to process a request of contents, and to insert first identification information for identifying a broadcast area capable of being received by the information processing device, and second identification information for identifying the contents; and a step of allowing the information processing device to process a response to be returned through communication or a response to be returned through broadcast, as a response with respect to the request to be transmitted from a transmitting device.

REFERENCE SIGNS LIST

11 DASH server
12 Switching server
13 Broadcast server
14 ESG and metadata server
21 Proxy server
22 DASH client
31 Transmitting station
41 Internet
100 Processor
101 Communication I/F
111 MPD processor
112 DASH segment processor
120 Processor
121 Communication I/F
122 Storage unit
123 Communication I/F
124 Communication I/F
131 Request processor
132 Broadcast processor
133 Communication processor
140 Processor
141 Communication I/F 142 Transmitting unit
151 ESG and metadata processor
152 DASH segment processor
200 Processor
201 Tuner
202 Communication I/F
203 Communication I/F
211 ESG and metadata processor
212 Request processor
220 Processor
221 Communication I/F
222 Display unit
223 Speaker
231 Request processor
232 Reproducing unit
1000 Computer
1001 CPU

The invention claimed is:

1. An information processing device, comprising:
processing circuitry configured to:
receive a segment request from a receiving device, the segment request requesting delivery of a segment of a piece of content; and
control the delivery of the segment of the piece of content to the receiving device in response to the segment request,
wherein
the segment request includes
a segment identifier identifying the segment of the piece of content,
a broadcast identifier identifying a broadcast signal that is receivable by the receiving device, and
a content identifier identifying the piece of content, and
the processing circuitry is configured to select one of broadband communication and broadcast transmission as a delivery path for the delivery of the segment of the piece of content to the receiving device, on a basis of the segment identifier, the broadcast identifier, and the content identifier, the broadcast transmission being configured based on the broadcast identifier.

2. The information processing device according to claim 1, wherein the processing circuitry is configured to:
select the broadband communication as the delivery path, in a case that off-loading traffic of the broadband communication is determined not to be performed, and
select the broadcast transmission as the delivery path, in a case that the off-loading the traffic of the broadband communication is determined to be performed.

3. The information processing device according to claim 1, wherein the processing circuitry is configured to:
determine a count value representing a number of requests, including the segment request, for the segment of the piece of content identified by the segment identifier and the content identifier within a specified period; and
allow selection of the broadcast transmission as the delivery path, in a case that the count value is greater than or equal to a threshold value.

4. The information processing device according to claim 1, wherein the processing circuitry is configured to:
in a case that the broadcast transmission is selected as the delivery path, output a request for update of control information in order to notify the receiving device that the delivery of the segment of the piece of content is performed by a first server through the broadcast transmission.

5. The information processing device according to claim 4, wherein the processing circuitry is configured to:
transfer the segment of the piece of content that is to be delivered in response to the segment request from a second server to the first server that correspond to transmission of the broadcast signal identified by the broadcast identifier.

6. The information processing device according to claim 4, wherein the processing circuitry is configured to:
in a case that the receiving device fails to receive the segment of the piece of content delivered through the broadcast transmission, allow the segment of the piece of content to be delivered through the broadband communication.

7. The information processing device according to claim 1,
wherein the broadcast identifier corresponds to a radio frequency (RF) channel, and
the content identifier is a universal unique identifier for a program or an advertisement identifier.

8. The information processing device according to claim 5,
wherein the piece of content is delivered from the second server, as a live stream or a video on demand (VOD) stream.

9. The information processing device according to claim 1, wherein
the broadband communication includes the Internet, and
the broadcast transmission includes transmission according to terrestrial broadcast corresponding to an Internet protocol (IP) transmission system.

10. An information processing method of an information processing device, the method comprising:
receiving, by processing circuitry of the information processing device, a segment request from a receiving device, the segment request requesting delivery of a segment of a piece of content and including
a segment identifier identifying the segment of the piece of content,
a broadcast identifier identifying a broadcast signal that is receivable by the receiving device, and
a content identifier identifying the piece of content; and
controlling, by the processing circuitry of the information processing device, the delivery of the segment of the piece of content to the receiving device in response to the segment request, including selecting one of broadband communication and broadcast transmission as a delivery path for the delivery of the segment of the piece of content to the receiving device, on a basis of the segment identifier, the broadcast identifier, and the content identifier, the broadcast transmission being configured based on the broadcast identifier.

11. An information processing device, comprising:
processing circuitry configured to:
generate a segment request requesting delivery of a segment of a piece of content, the segment request including a segment identifier, a broadcast identifier, and a content identifier, the segment identifier identifying the segment of the piece of content, the broadcast identifier identifying a broadcast signal that is receivable by the information processing device, and the content identifier identifying the piece of content;
transmit the segment request to a server device; and
receive the segment of the piece of content delivered in response to the segment request and through a delivery path selected from broadband communication or broadcast transmission, the broadcast transmission being configured based on the broadcast identifier.

12. The information processing device according to claim 11, wherein
the broadband communication is selected as the delivery path, in a case that off-loading traffic of the broadband communication is determined not to be performed, and
the broadcast transmission is selected as the delivery path, in a case that the off-loading the traffic of the broadband communication is determined to be performed.

13. The information processing device according to claim 11, wherein the processing circuitry is configured to:
determine whether or not the delivery of the segment of the piece of content performed by a first server through the broadcast transmission is available according to configuration information regarding the first server received from the first server.

14. The information processing device according to claim 13, wherein the processing circuitry is configured to:
in a case that the delivery of the segment of the piece of content performed by the first server through the broadcast transmission is determined to be available, include the broadcast identifier and the content identifier in the segment request; and
in a case that the delivery of the segment of the piece of content performed by the first server through the broadcast transmission is determined to be not available, include the content identifier in the segment request without inclusion of the broadcast identifier.

15. The information processing device according to claim 13,
wherein the configuration information regarding the first server is included in control information to be delivered through the broadcast transmission.

16. The information processing device according to claim 13,
wherein the configuration information regarding the first server is included in program information to be delivered in advance to the delivery of the segment of the piece of content.

17. The information processing device according to claim 11, wherein
the broadcast identifier corresponds to an radio frequency (RF) channel,
the content identifier is a universal unique identifier for a program or an advertisement identifier, and
the processing circuitry is configured to include the broadcast identifier and the content identifier in an expansion portion of a hypertext transfer protocol (HTTP) header of the request.

18. The information processing device according to claim 11,
wherein the piece of content is delivered from a second server as a live stream or a video on demand (VOD) stream.

19. The information processing device according to claim 11, wherein
the broadband communication includes the Internet, and
the broadcast transmission includes transmission according to terrestrial broadcast corresponding to an IP transmission system.

20. An information processing method of an information processing device, the method comprising:
generating, by processing circuitry of the information processing device, a segment request requesting delivery of a segment of a piece of content the segment request including a segment identifier, a broadcast identifier, and a content identifier, the segment identifier identifying the segment of the piece of content, the broadcast identifier identifying a broadcast signal that is receivable by the information processing device, and the content identifier identifying the piece of content;
transmitting the segment request to a server device; and
receiving the segment of the piece of content delivered in response to the segment request of contents and through a delivery path selected from broadband communication or broadcast transmission, the broadcast transmission being configured based on the broadcast identifier.

* * * * *